Oct. 4, 1960    R. M. LAMADE, JR., ET AL    2,954,906
AUTOMATIC HANDLING EQUIPMENT
Filed Feb. 9, 1959    17 Sheets-Sheet 1

Ralph M. Lamade, Jr.   John B. Whitehouse
Carmelo A. DiMaggio   George H. Hall
George A. Wood, Jr.         INVENTORS.

BY
Attorney

DETAIL OF ADJUSTMENT

Ralph M. Lamade, Jr.
John B. Whitehouse
Carmelo A. DiMaggio
George H. Hall
George A. Wood, Jr.
INVENTORS.

BY
Attorney

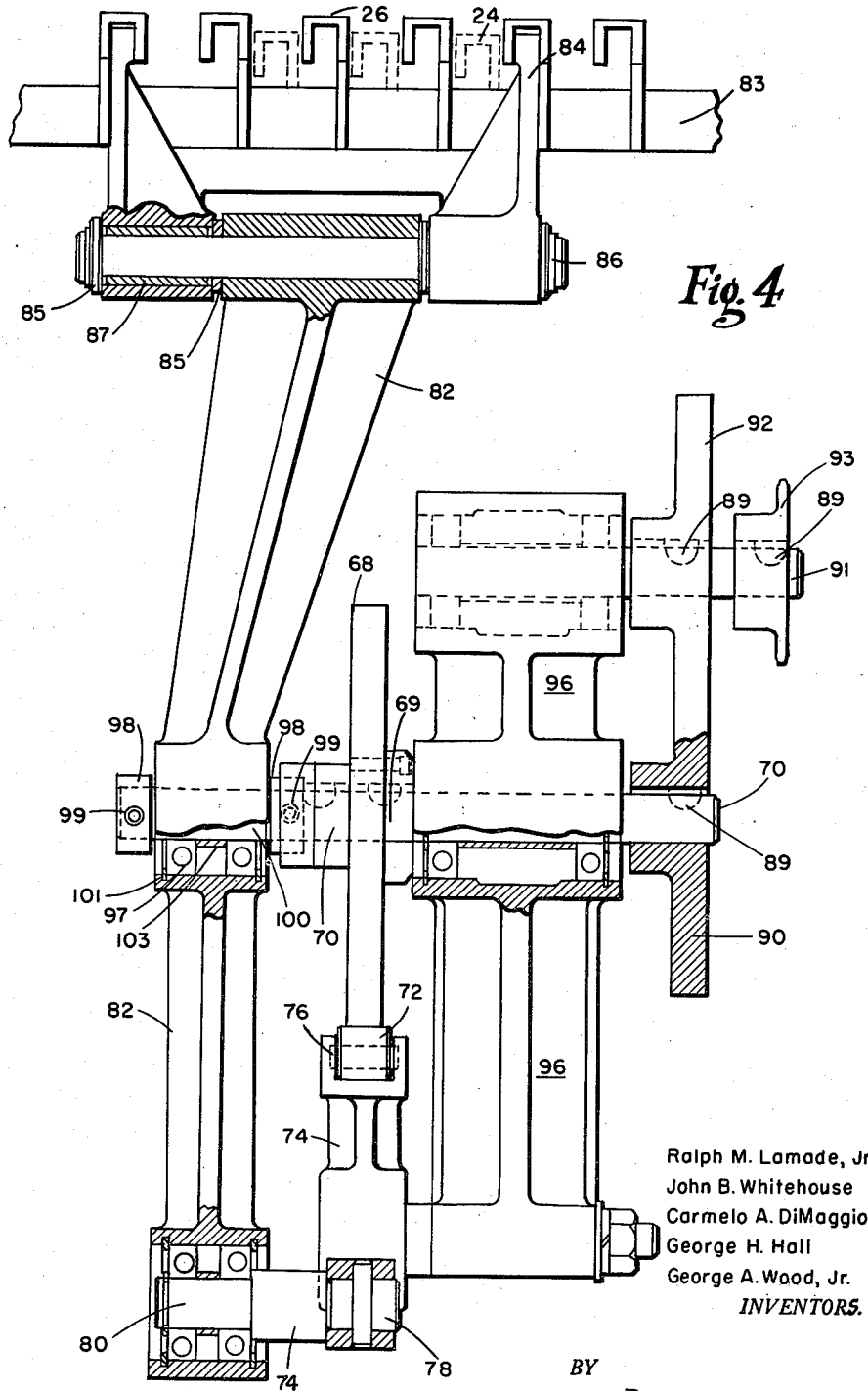

Oct. 4, 1960 R. M. LAMADE, JR., ET AL 2,954,906
AUTOMATIC HANDLING EQUIPMENT
Filed Feb. 9, 1959 17 Sheets-Sheet 5

Ralph M. Lamade, Jr.  John B. Whitehouse
Carmelo A. DiMaggio  George H. Hall
George A. Wood, Jr.       INVENTORS

BY

Attorney

Oct. 4, 1960    R. M. LAMADE, JR., ET AL    2,954,906
AUTOMATIC HANDLING EQUIPMENT
Filed Feb. 9, 1959    17 Sheets-Sheet 8

Ralph M. Lamade, Jr.    John B. Whitehouse
Carmelo A. DiMaggio    George H. Hall
George A. Wood, Jr.    INVENTORS.

BY

*Bessie A. Lynyer*
Attorney

Oct. 4, 1960  R. M. LAMADE, JR., ET AL  2,954,906
AUTOMATIC HANDLING EQUIPMENT
Filed Feb. 9, 1959  17 Sheets-Sheet 10

Ralph M. Lamade, Jr.  John B. Whitehouse
Carmelo A. DiMaggio  George H. Hall  INVENTORS.
George A. Wood, Jr.
BY
Bessie A. Lipper
Attorney

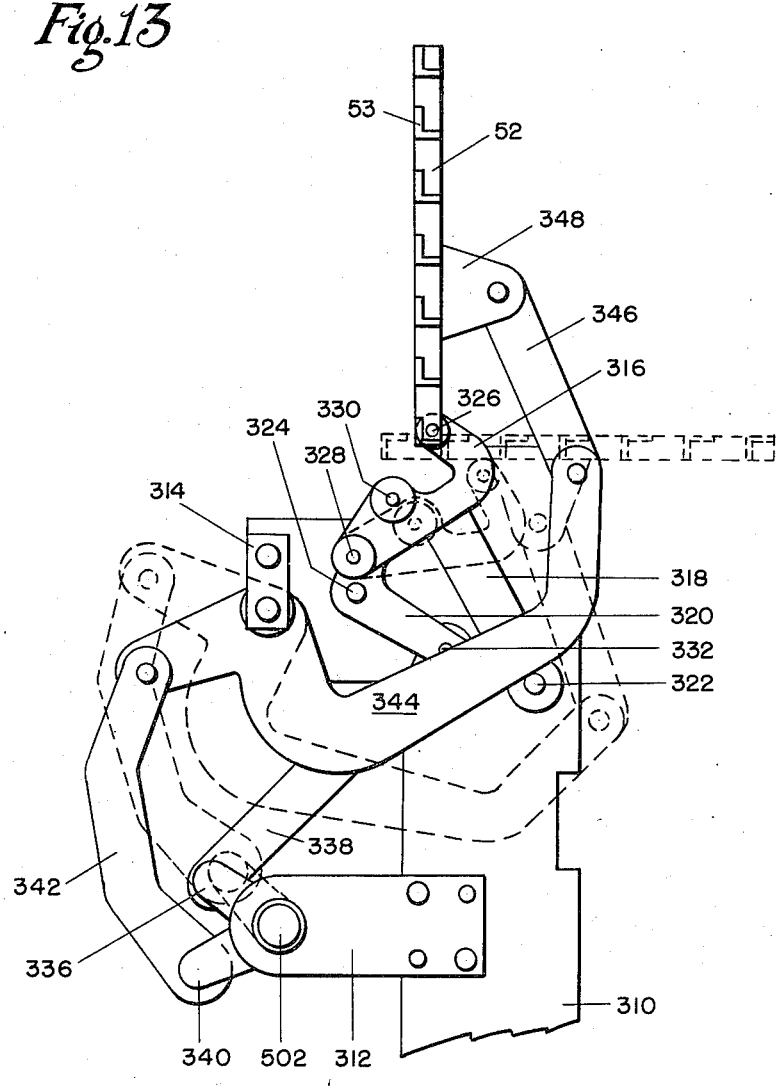

Oct. 4, 1960  R. M. LAMADE, JR., ET AL  2,954,906
AUTOMATIC HANDLING EQUIPMENT
Filed Feb. 9, 1959  17 Sheets-Sheet 13
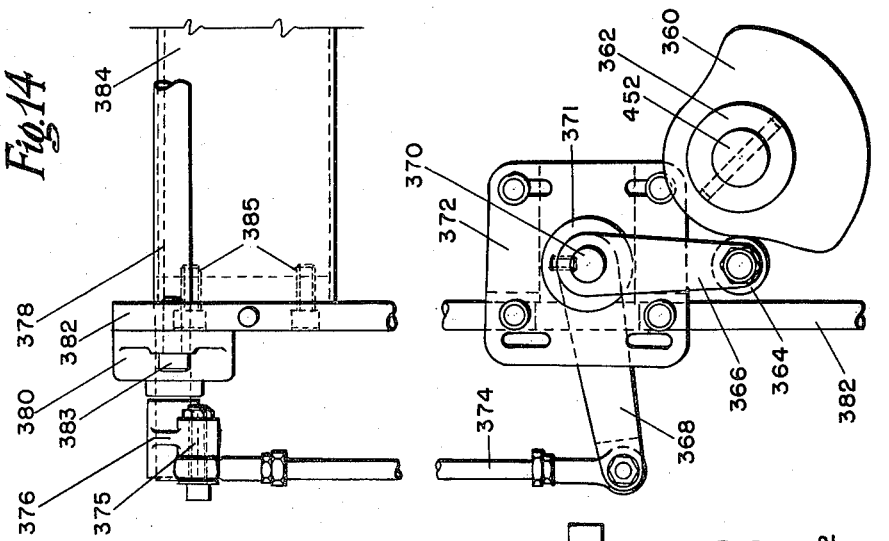
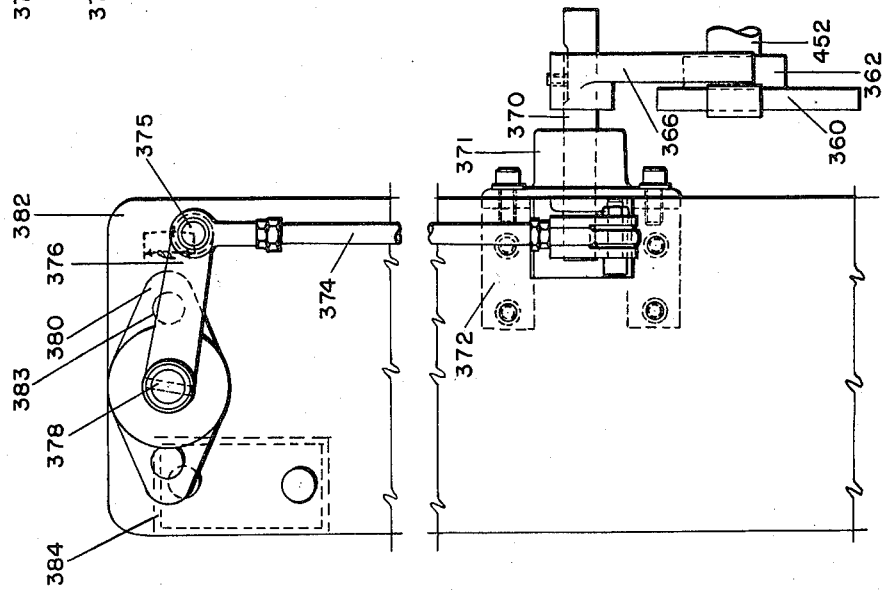
INVENTORS
Ralph M. Lamade, Jr.   John B. Whitehouse
Carmelo A. DiMaggio   George H. Hall
George A. Wood, Jr.
BY
Attorney Oct. 4, 1960   R. M. LAMADE, JR., ET AL   2,954,906
AUTOMATIC HANDLING EQUIPMENT
Filed Feb. 9, 1959   17 Sheets-Sheet 14

Ralph M. Lamade, Jr.   John B. Whitehouse
Carmelo A. DiMaggio   George H. Hall
George A. Wood, Jr.   INVENTORS.

BY

Attorney

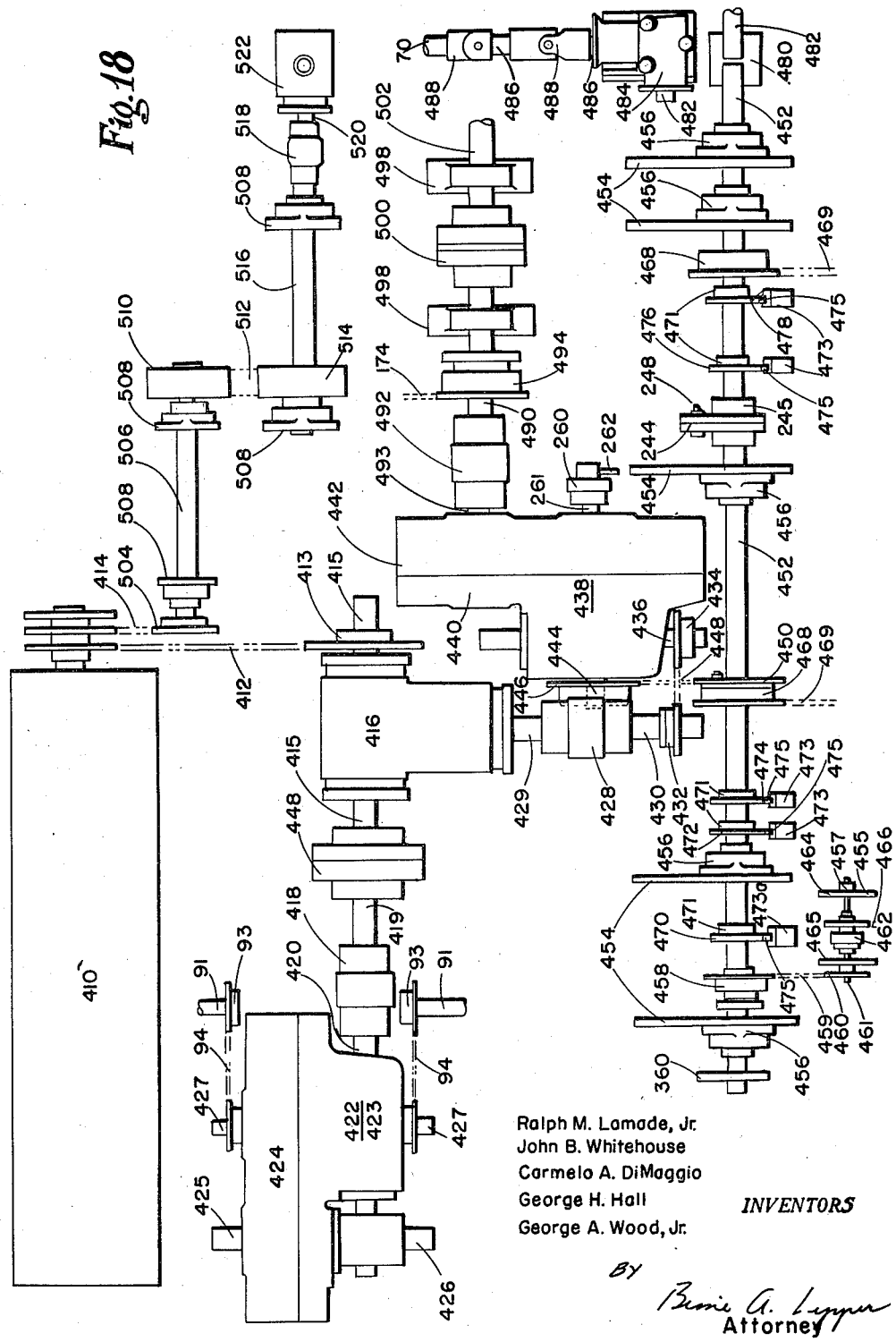

Oct. 4, 1960  R. M. LAMADE, JR., ET AL  2,954,906
AUTOMATIC HANDLING EQUIPMENT
Filed Feb. 9, 1959  17 Sheets-Sheet 16

Ralph M. Lamade, Jr.
John B. Whitehouse
Carmelo A. DiMaggio
George H. Hall
George A. Wood, Jr.
INVENTORS.

BY

Attorney

2,954,906
AUTOMATIC HANDLING EQUIPMENT

Ralph M. Lamade, Jr., Concord, John B. Whitehouse, Cochituate, Carmelo A. Di Maggio, Waltham, George H. Hall, Watertown, and George A. Wood, Jr., South Lincoln, Mass., assignors to Arthur D. Little, Inc., Cambridge, Mass., a corporation of Massachusetts
Filed Feb. 9, 1959, Ser. No. 792,151
27 Claims. (Cl. 223—1)

This invention relates to an apparatus for automatically processing items which are to receive some form of treatment before being packaged. The treatment may include tagging, folding, stamping and the like. More particularly, this invention is concerned with the handling of normally sheer or light-weight items of clothing which are customarily tagged, folded and stamped to indicate size, price, and the like before being packaged.

Items of clothing such as nylon hosiery are processed in great numbers and it would be highly desirable to have available equipment which could carry out this processing automatically and reliably. At present, it is customary to inspect, fold, tag and stamp such items entirely by hand. This is expensive and the processing is, of course, subject to human errors. Apparatus which has been developed for handling other items is not adaptable to the handling of nylon hosiery and the like because of the nature of such items. It can be appreciated that the very qualities of a pair of nylon hosiery, e.g., extremely light weight, sheerness, and the stockings' tendency to slip with respect both to each other and to the pair's location makes them extremely difficult to handle automatically. Thus to pick up a pair of nylon hosiery by any ordinary means or to convey them by a regular conveying belt would not be possible. It is, therefore, necessary to provide equipment which is so coordinated and so arranged that a pair of nylon hosiery may be handled and processed without as much as disturbing their alignment, either with relationship to the handling equipment or with relationship to the position of the two stockings in the pair.

The same type of difficulties in handling are inherent in other pieces of clothing such as sheer lingerie, blouses and the like. The apparatus of this invention is also adaptable to processing such items and is not limited to nylon hosiery. However, for the sake of convenience in describing the apparatus of this invention it will be presented in terms of processing a pair of nylon hosiery.

It is, therefore, an object of this invention to provide automatic equipment for handling normally sheer materials. It is another object to provide such equipment which is capable of processing a pair of nylon hosiery from the point at which a pair of hosiery is placed onto the equipment to the point at which the pair emerges in a tagged, folded and stamped condition, ready for further processing in automatic boxing and/or packaging apparatus. (The boxing and/or packaging apparatus is not, however, a part of this invention.) It is further an object of this invention to provide automatic apparatus which can process a pair of nylon hosiery in the manner described above reliably, accurately and at a rapid rate. These and other objects will become apparent in the discussion below as the description proceeds.

The apparatus, its construction and method of operation will be described in detail with reference to the accompanying drawings in which:

Fig. 4 is a cross-section of the transport mechanism taken along the crosswise direction of the apparatus of Fig. 2;

Fig. 13 is a front plan view of the welt-folding mechanism showing the welt folder in two positions; before and half-way through the folding operation;

Fig. 14 is a cross-sectional view, taken along the crosswise direction of the apparatus, of the inspection system drive;

Fig. 15 is a cross-sectional view, taken along the lengthwise direction of the apparatus, of the inspection system drive;

Fig. 18 is a top plan view showing the drive and shaft arrangement for the apparatus of this invention;

I. GENERAL DESCRIPTION

Figure 1:
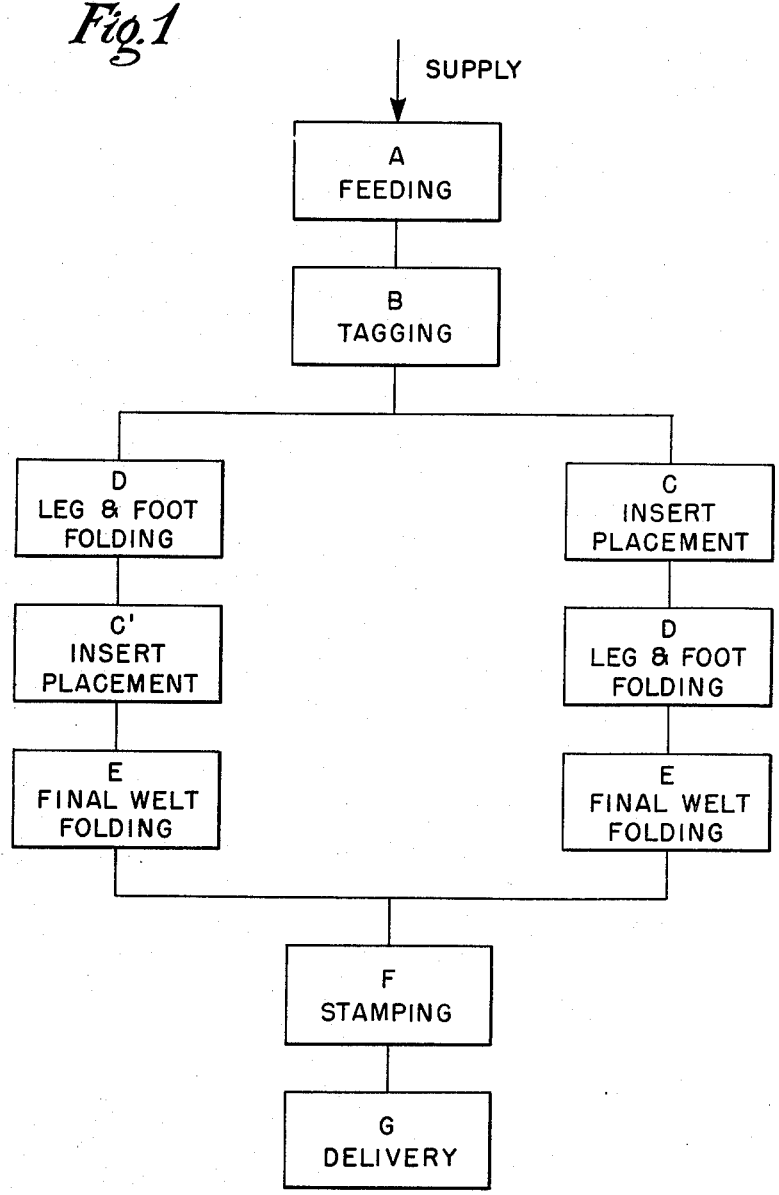
Fig. 1 is a schematic flow diagram representing the steps in the processing of a pair of nylon hosiery.
Figure 2:
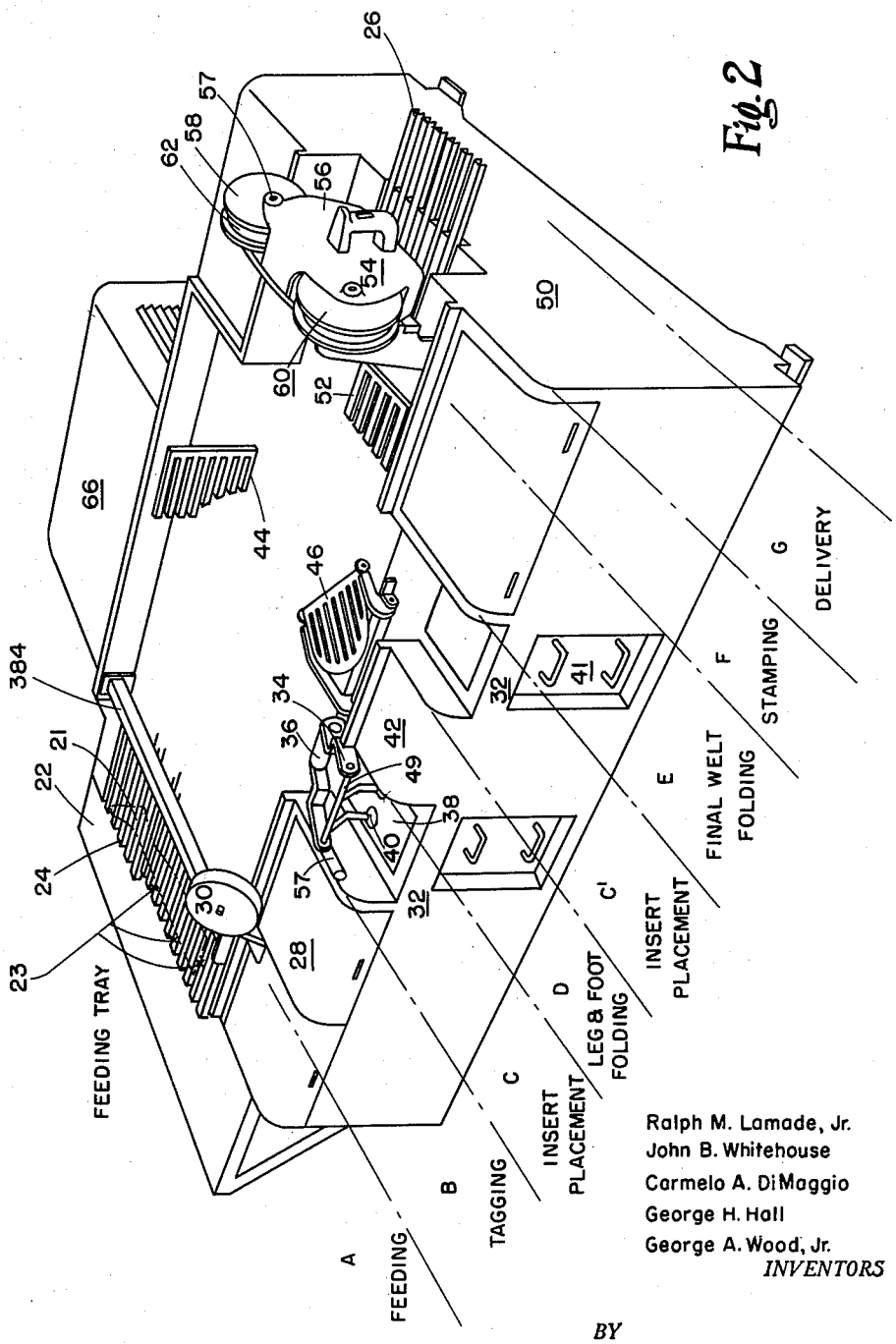
Fig. 2 is a perspective view of the apparatus of this invention, showing the various stations or steps involved in the processing.

(Figs. 1 and 2)

In general, the apparatus of this invention includes a feeder means on which a pair of nylon hosiery is placed, a means for placing a tag in a predetermined location along the top edge of the hose, first folding means which combines the steps of folding the pair of hosiery approximately in half, and folding over the extending foot portion of the hose, means for inserting a paper interliner, usually known as an insert, either before or after the first folding step, second folding means for folding the welt and folded foot over the leg of the hose, means for placing a transfer design on the welt of the stocking, and interdigitated conveying or transport means which move the pair of hosiery at a specified rate and between each of the other means recited. Associated with the leg folding means are adjusting means which make it possible to fold hosiery of varying lengths substantially in half; while another type of adjusting means is associated with the interdigtated conveying means which permit adjusting the distance the hose can be moved between stations.

The components of the apparatus are so driven and so coordinated that the stocking is being continuously processed and is handled in a manner to keep it always in proper alignment. Means are also included for determining whether the pair is in the proper alignment for the various operations in the pair's progress through the apparatus, thus allowing an improperly aligned pair to proceed through the apparatus and be removed prior to the subsequent packaging operations.

The apparatus of this invention is represented functionally in Fig. 1 and is shown in perspective in Fig. 2. The apparatus may be divided into seven so-called "stations," designated in Figs. 1 and 2 as Stations A through G. The detailed description given below will be divided into a presentation of the mechanism of each of these stations, preceded by a description of the transport mechanism. The inspection system, control mechanisms and timing will also be presented in appropriate sequence.

This in turn will be followed by a detailed description of the sequence of the operation of the apparatus, tracing the progress of a pair of nylon hosiery through the apparatus.

Briefly the entire apparatus may be first described to illustrate how these stations are coordinated into one integral apparatus. Station A, designated the Feeding Station, comprises first a tray on which pairs of properly paired hosiery are laid in proper alignment. One pair at a time is then conveyed manually to a temporary holding means which consists of a stationary bed of bars mounted on a frame of the unit. There the pairs of hosiery are picked up by a moving, interdigitated conveying means (hereinafter called transport means) and moved to an inspection device. After inspection they are transported to an automatic tagging device at Station B. Tags are placed on the edge of the welt (top portion) of the hosiery in this tagging station and then the transport means carries the pair of hosiery to Station C, at which point a paper insert is placed on the hosiery. Alternatively, this paper insert may be placed in its position on the hosiery at Station C' after the hosiery have been processed at Station D. Folding Station D folds the stockings over lengthwise so they are folded substantially in half, an operation which leaves the larger portion of the foot extending beyond the leg portion of the hosiery. Therefore, at Station D it is also necessary to provide means for folding back the foot so that the resulting folded hosiery somewhat resembles a rectangular form. After the insert has been placed either at Station C or C' the half-folded pair is carried on to Station E where final folding is accomplished by folding the upper or welt portions of the stockings over the insert, thus leaving the welt exposed for the stamping operation in Station F. There at Station F a transfer pattern is put on by means of heat and the resulting folded, tagged and marked hosiery are carried by interdigitated conveying means to the delivery Station G.

In Fig. 2 there is shown a perspective view of the apparatus of this invention. A suitable feeding tray 22 is provided from which an operator picks up a pair of hosiery and places in onto stationary interdigitated bars 24. The nylon hosiery are moved from station to station in ths apparatus by means of moving interdigitated bars 26 (such as shown in Station G) which are operated by a transport mechanism (discussed below). This transport mechanism serves to periodically move the hosiery from station to station.

Station B, the tagging station, consisting of a suitable tagging mechanism 28, such as described in a copending application Serial No. 736,571, filed on May 20, 1958, in the names of Carmelo A. DiMaggio, J. W. Healy and Ralph M. Lamade, Jr. The tag supply roll 30 may be seen to extend above tagging mechanism 28.

The first and second insert placement Stations C and C' are identical in construction. In Fig. 2 a portion of the mechanism is removed at Station C' for simplification of illustration. The insert placement mechanism 32 is made up of rotatable frame 34 on which a pivotally mounted yoke 36 is held. Yoke 36 is equipped with 2 suction cups 40 and is moved downward to pick up the insert 38 and then through an arc of approximately 180° by means of rotating frame 34 to a position over that occupied by the nylon hosiery as it comes directly from the tagging mechanism 28. In each of Stations C and C' a draw-type magazine 41 is provided for loading and placing a supply of inserts 38 in proper position.

Station D, consisting of the first folding mechanism 42, is the station where the hosiery is folded approximately in half lengthwise by the leg folder 44 and the foot is folded back over a portion of the leg by foot folder 46.

Station E, or the final welt-folding station, comprises the folder 52 which serves to fold the welt over to align it in proper position for subsequent moving to the stamping station.

The Stamping Station F comprises the stamping mechanism 54 which in turn is made up of a frame 56, a supply roller 60, which supplies heat sensitive transfer tape 62, and take-up roller 58. As the heat sensitive transfer tape 62 passes through the stamping mechanism, heat is periodically applied to a section of the tape in contact with the hosiery to transfer a suitable label to the welt of the hosiery.

Finally there is the Delivery Station G from which the folded, tagged and stamped hosiery are removed from moving bars 26 for packaging.

The entire apparatus is installed in suitable housing such as generally indicated by the numeral 50. The required electrical equipment associated with the apparatus is also located within this housing 50, and is generally indicated at 66.

II. TRANSPORT MECHANISM

*(Figs. 3, 4 and 5)*

It is the function of the transport mechanism of the apparatus of this invention to move the pair of nylon hosiery from station to station. This conveying process must be accomplished in a manner to keep the nylon hose always in proper alignment with respect to the two stockings making up the pair as well as with respect to the position of the pair at each station. Without such a transport mechanism, the mechanisms located at the various stations could not be coordinated to form the integral automatic apparatus of this invention. The transport mechanism will therefore be presented first in detail.

As pointed out in connection with the discussion of Fig. 2, the transport mechanism is made up of stationary and moving interdigitated bars. In order to operate this type of transport mechanism in a manner to successfully handle items such as nylon hosiery, it is necessary that the moving interdigitated bars be capable of vertical and horizontal movement. Thus, they must be able to rise slightly above the stationary bars to lift up the hosiery, then move through a predetermined length and finally to drop slightly below the level of the stationary bars to deposit the hosiery on the stationary interdigitated bars at the proper station for further processing. Furthermore, it is desirable that adjustment means be incorporated in the mechanism to change the predetermined distance through which the hose are moved, i.e., to change the distance between the stations. As will be seen, this is provided for in the apparatus of this invention.

Figures 3, 5:
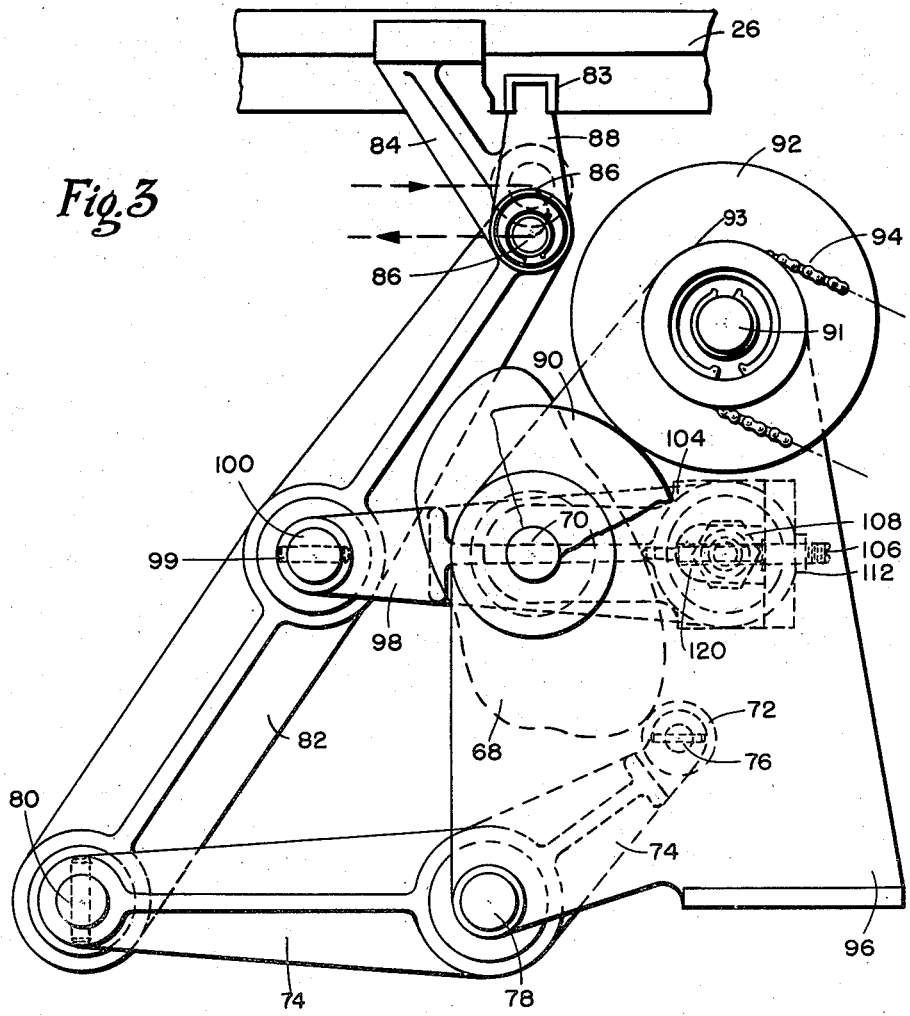
Fig. 3 is a cross-section of the transport mechanism taken along the lengthwise direction of the apparatus of Fig. 2.
Fig. 5 is a detailed cross-section of the adjustment mechanism associated with the transport mechanism.

In the figures, Figs. 3 and 4 are cross-sectional representations of the transport mechanism and of the driving mechanisms associated with it. Fig. 5 shows in detail the adjustment device whereby the travel distance of the transport mechanism from station to station is controlled.

With reference now to Figs. 3 and 4, cam 68 is driven by shaft 70 and attached thereto by a suitable hub 69. This cam 68 provides the necessary vertical movement for the moving bars 26 between the stationary bars 24.

Cam follower 72 is attached to cam follower arm 74 through pin 76, the cam follower arm in turn pivoting on pin 78 with respect to cam support mounting 96. Cam follower arm 74 is in turn mechanically connected to table driving arm 82 through pin 80, and table driving arm 82 is in turn attached to table support 84 through pin 86 and suitable bearings indicated at 87 and the spacer 85. Table support 84 and auxiliary arm 88 are permanently welded or otherwise suitably affixed to main moving bar 26 and support bar 83, respectively. In Fig. 3 the dotted lines indicate the upper position of pin 86, the distance between the center points of the two pin positions representing the extent of vertical travel achieved by bars 26.

Cam shaft 70 is driven by gear 90 and attached therewith by key 89 (Fig. 4). Gear 90 is in turn driven by drive gear 92 attached to shaft 91 through key 89. Drive gear 92 in turn is driven through a sprocket 93 and chain 94 off a main sprocket 427 of a star wheel 422 (see Fig. 18 which shows the entire driving system for the apparatus).

The horizontal movement of the moving interdigitated bars 26 is provided by the driving yoke 98 and its associated mechanism is shown in Figs. 3 and 4 and in detail in Fig. 5. Driving yoke 98 is attached to table driving arm 82 through driving yoke pin 100, and locking pins 99. Suitable rings 101, ball bearings 97 and bushing 103 (Fig. 4) are provided for making this mechanical connection. Crank 104, attached to driving yoke 98 by means of crank pin 118, is driven from cam shaft 70 and affixed through key 122. Crank 104 thus travels in a complete circle and achieves the function of a walking beam. By adjusting the length of crank 104 it is possible to adjust the length of travel of the interdigitated bars 26.

The manner in which this length of travel is adjusted is shown in detail in Fig. 5. Crank arm 104 is fitted with an adjusting screw 106 which engages a crank pin 118 held within a recess 120. The adjusting screw 106 is held permanently in relation to the crank 104, but may be turned by temporarily loosening lock nut 112, and crank pin lock nut 108 on crank pin 118. This turning causes the crank pin 118 to move in recess 120, thereby changing the distance between cam shaft 70 and crank pin 118. Since the distance between the centers of cam shaft 70 and crank pin 118 determines the radius of turn of the crank 104 and hence the distance of travel, the distance through which interdigitated beam 26 moves is controlled. Crank pin 118 is physically connected to driving yoke 98 and hence to table driving arm 82 which must follow the dictates of the radius thus determined.

In the operation of this transport mechanism to move nylon hosiery from station to station drive gear 92 is driven at 30 revolutions per minute, which means that driven gear 90, shaft 70 and cam 68 operates at this same speed. In this illustrative example (which is not meant to be limiting) cam 68 is so designed as to give the table support 84, and hence the movable interdigitated bars 26, a total vertical movement of one-half inch, so that the interdigitated bars will have moved one-quarter inch below and one-quarter inch above the level of the stationary interdigitated bars 24 during the complete cycle of travel. The driving yoke in turn is so adjusted to impart horizontal travel to the bars 26, first 15 inches to the left while the bars are in their lower position and then 15 inches to the right while the bars are raised to their highest position. The travel of the bars thus achieves essentially a rectangular path (indicated in Fig. 3 by dotted lines and arrows) which is one-half inch high and 15 inches long.

In describing this almost rectangular path of travel, the moving bars 26 remove the pair of hosiery without disturbing its alignment, transport it 15 inches to the next station, and there deposit the pair on the stationary interdigitated bars for processing at that station. As will be noted in Fig. 18, drives for three transport mechanisms of the type described are provided, two at the forward end and one incorporated just forward of the stamping mechanism of Station F. It is this transport mechanism which makes possible the handling of nylon hosiery and other similar items in the apparatus of this invention in such a reliable and accurate manner that the hosiery coming out at the Delivery Station G can be packaged directly. Moreover, this transport mechanism incorporates a novel way in which the distance of bar travel may be adjusted.

III. FEEDING—STATION A
(*Fig. 2*)

Feeding or introducing the pair of nylon hosiery into the apparatus of this invention may be accomplished by hand or by a feeding mechanism such as by a ferris wheel type of arrangement by which the hoisery would be deposited on the forward terminal portion of the movable interdigitated bars of the transport mechanism. If feeding is to be done by hand, as illustrated in Fig. 2, the pair of nylon hosiery are transferred by an operator from tray 22 and placed on the stationary interdigitated bars 24 in a manner to align the pair of hosiery 21 with respect to 3 points designated for convenience of illustration as crosses (+) 23 in Fig. 2.

It may, however, be more convenient to place the pair of hosiery on a feeder and permit the feeder to deposit it on the stationary bars 24 or on the movable interdigitated bars 26. Thus, a platform 22 may itself be of the interdigitated type which can be mechanically operated to deliver the pair of hosiery to the stationary bars 24. In the case of manual feeding, the feeder platform 22 will be equipped with guide points which correspond to points 23 shown on stationary bars 24 to allow the operator to place the hosiery thereon in proper alignment. Since this alignment will determine the subsequent alignment of the pair of hosiery through its entire travel from station to station in the apparatus, it is important that the original alignment be accurate. Once the pair of hosiery is placed on the stationary bars 24, it is in position to be picked up by the transport mechanism to be carried to the tagging station in the manner described in connection with the description of the transport mechanism in Section II above.

The feeding mechanism may be any means suitable for moving a platform into desired relationship with the stationary bars 24 so that the pair of hosiery may be properly picked up by the moving interdigitated bars 26. Thus, a series of platforms may be located on a ferris wheel-type arrangement, each of the platforms of the ferris wheel depositing a pair of hosiery on the stationary bars or on the moving interdigitated bars as each platform moves into proper position with relationship to the machine. Other suitable feeding mechanisms may be designed such as one which would move laterally from a position directly in front of the operator placing the hosiery on it to a position in proper alignment with the machine for proper movement of the pair of hosiery through the machine.

IV. TAGGING—STATION B
(*Fig. 2*)

In the apparatus of this invention tagging is preferably done by an apparatus such as described in our copending application, Serial No. 736,571, filed May 20, 1958, in the names Carmelo A. DiMaggio, James W. Healy and Ralph Lamade, Jr. The tagging apparatus described in the above-identified application is particularly well suited to the application of tags having displaceable tabs to items such as hosiery which might be injured by the use of staples or other fastening devices. Alternatively, the tagging apparatus may be of a kind which applies tags coated on the back with a pressure-sensitive adhesive. This type of apparatus would periodically detach and press down on the welt of the hose a small tag which would remain affixed to the welt by virtue of the pressure-sensitive adhesive.

V. INSERT PLACEMENT—STATIONS C AND C'
*(Figs. 2 and 6)*

The paper inserts about which the pair of hosiery is to be folded may be placed on the hosiery before the first folding step or after the leg and foot folding has been accomplished. In the usual packaging of hosiery these inserts are commonly about 7 by 9¼ inches. In the arrangement illustrated in Figs. 2 and 6 inserts are fed from a magazine, picked up by a set of vacuum cups, and automatically moved into position over the hosiery. An automatic mechanism is also provided whereby a supply of inserts is always in a position to be picked up and used.

Figure 6:
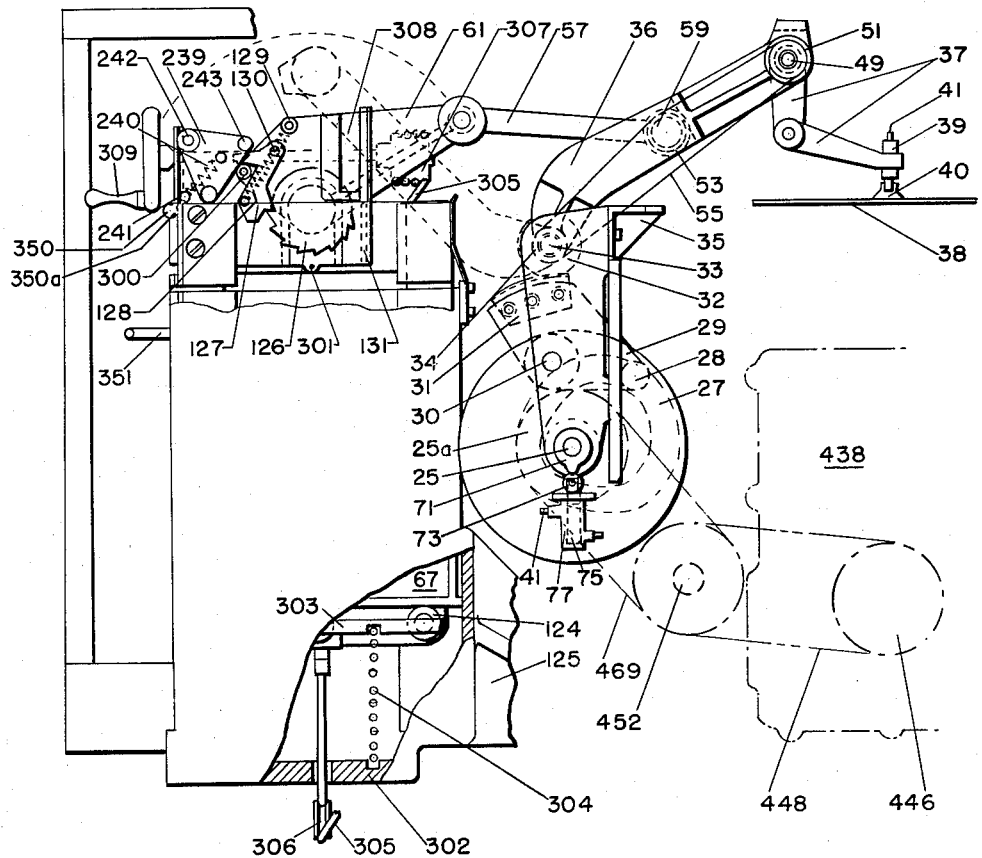
Fig. 6 is a cross-section, taken along the crosswise direction of the apparatus of the insert mechanism.

Fig. 6 represents a detailed cross-section of the insert mechanism of this invention. The cross-section is taken crosswise of the apparatus as shown in persepctive in Fig. 2. In Fig. 6 the insert mechanism will be seen to be driven by cam shaft 25, which in turn is rotated through a sprocket 25a which is driven by chain 469 off main shaft 452. The driving mechanism including star wheel 438, sprocket 446 and chain 448 is illustrated in Fig. 18.

Cam shaft 25 is permanently affixed to a box-type cam 27 which serves to control the oscillating movement of an insert arm as described below. For this purpose there are provided cam follower 28, cam follower arm 29, a support shaft 30, and a cam follower gear segment 31 which is affixed to the uppermost portion of the cam follower arm 29. The cam follower gear segment 31 engages an insert arm pinion gear 32 which is mounted on a support shaft 33. At this point there is also located a sprocket 34 which is grounded to main frame 35, the function of which is discussed later.

Attached to insert arm support shaft 33 and moved by it is the insert arm 36. This in turn is attached to a vacuum arm support 37. To this arm support 37 is attached a vacuum pick-up 39 from which depends a vacuum cup 40 which in turn is connected to a vacuum line 41 which passes through vacuum pick-up 39. There are provided two of these vacuum cups 40, and they are so located that they contact and are attached to the forward end of the insert 38. It has been found that better control of the movement of the insert is obtained when it is picked up at this point. The necessary support shafts such as vacuum head support shaft 49 are supplied to connect the insert arm 36 with the vacuum arm support 37.

Located at the outer end of insert arm 36 is rotating sprocket 51, while at its center portion is an idler sprocket 53. A chain 55 is wrapped around the rotating sprocket 51, the idler sprocket 53 and the grounded sprocket 34. This arrangement provides a means whereby the back and forth motion of the insert arm 36, transmits an oscillating motion to the vacuum arm support 37, hence the vacuum cup 40 is always positioned in the same relation with respect to the plane of the inserts 38.

Arm 61, being tied to oscillating arm 36, through connecting rod 57 and connecting rod pins 59, is driven with an oscillating motion. The purpose for this will be described below.

Before continuing the description of the mechanism by which the inserts are fed and mounted in proper horizontal position, it is necessary to turn first to the mechanism by which the vacuum in vacuum cup 40 is controlled. This is achieved through the use of a valve cam 71, mounted on shaft 25, and a cam follower 73 which is mechanically connected with a valve displacer 75. This valve displacer in turn is a part of the valve system 77 shown in somewhat schematic diagram in Fig. 6. It will be seen that by this means it is possible to provide a control of the vacuum to vacuum line 41 which is coordinated with the movement of the insert arm 36.

Returning now to the insert supply mechanism, it will be seen that it consists of a magazine-type feeder comprising a drawer 67, running on rollers 124 for ease in moving it back and forth for reloading. The entire insert supply system is attached to frame 125.

There is provided in connection with the insert feeding mechanism an automatic device for consistently keeping the supply of inserts 38 at the desired level. This automatic device, the operation of which will be described below, comprises a ratchet wheel 126, a driving pawl 127, which is equipped with a pawl spring 128 affixed to the pawl and to the frame 131 through pins 129 and 130. In this device there is also provided a sensing arm 239, held in place by a sensing arm spring 240 and attached through a spring pin 241. Sensing arm 239 is free to rotate on a sensing arm shaft 242. Located on the sensing arm 239 is a pawl actuator 243 while on oscillating arm 61 there is located a pawl stop 300, and on the frame 131 a pawl release pin 301.

Connected with and actuated by the sensing mechanism is that portion of the insert supply system which is located below drawer 67. This consists of the base of the frame 302 and the main platform 303, which engages the rollers 124. Connecting the base of the frame 302 and platform 303 is a strong spring 304, which consistently forces the base 303 against the inserts 38. A cable 305 is attached to the platform 303 and by way of pulley 306 and upper pulley 307, to the ratchet wheel shaft.

In the normal operation of the insert mechanism the oscillating arm 61 is moving back and forth through the arc indicated by the dotted line. If the insert 38 is moved into position at the proper uppermost level, sensing arm 239 will be in such a position as to permit the pawl spring 128 to maintain the pawl in position sufficiently to the left so that it does not engage the teeth of the ratchet wheel 126. However, as the supply of inserts 38 drops the sensing arm 239 rotates and when it reaches a predetermined lower level the effect is to roll the pawl actuator 243 to the point where it forces the pawl 127 to engage the ratchet wheel 126 and to remain engaged through one oscillation of the oscillating arm 161. During the period of the oscillation, the pawl drives the ratchet wheel 126 through a distance sufficient to release a predetermined length of cable 305 which is wrapped about pulley 307. In releasing this predetermined length of cable 305 the spring 304 is, in turn, released to the extent that it allows platform 303 to raise the inserts 38 sufficiently to feed another supply of inserts to the insert mechanism. Release pin 301 is provided to release pawl 127 from the ratchet wheel after the oscillating movement of the arm 61 brings pawl 127 into contact with release pin 301.

A pulley shaft handle 309 is provided for manual adjustment of the pulley and cable while an air line 350, having small ports 350a, is provided for supplying air to separate the inserts as they are being picked up. Finally drawer 67 is provided with handles 351 for manually pulling out the drawer to reload with inserts.

VI. LEG AND FOOT FOLDING—STATION D
*(Figs. 7–12)*

At Station D (see Fig. 2) the first folding operation is accomplished. This folding consists of two distinct mechanisms, the first designed to fold the leg of the hosiery into approximately one-half its original length and the second designed to fold the foot over onto the folded leg to give the resulting folded hosiery an essentially rectangular shape. In order to position the foot properly, i.e., to keep it from extending appreciably over the leg portion, the leg portion is folded at a slight angle.

Figure 7:
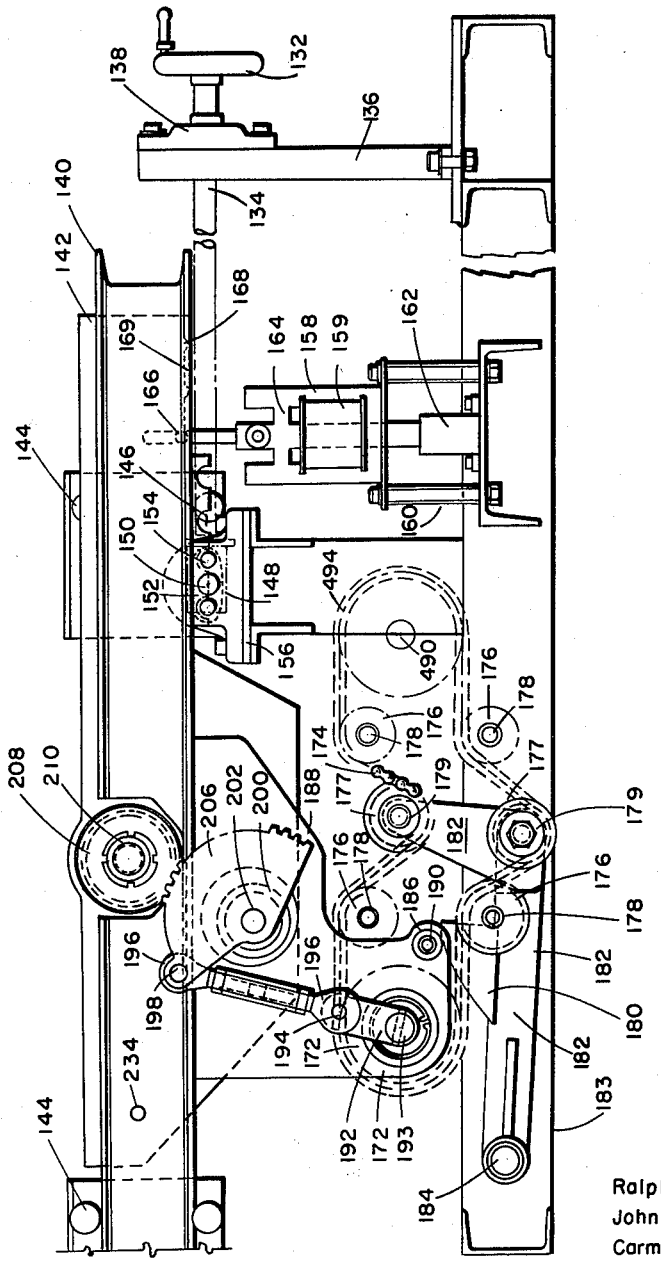
Fig. 7 is a cross-section, taken along the crosswise direction of the apparatus, of that portion of the first folder which folds the leg of the hosiery approximately in half.
Figure 8:
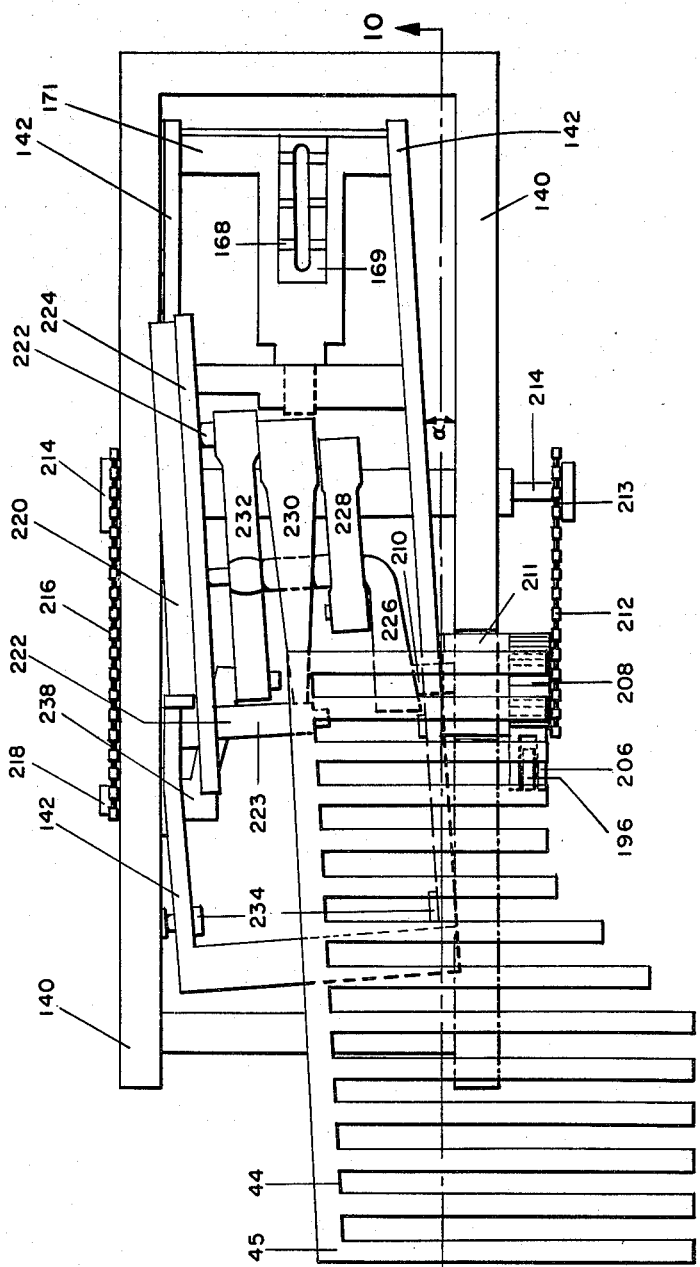
Fig. 8 is a top plan view of the leg-folding mechanism.
Figure 9:
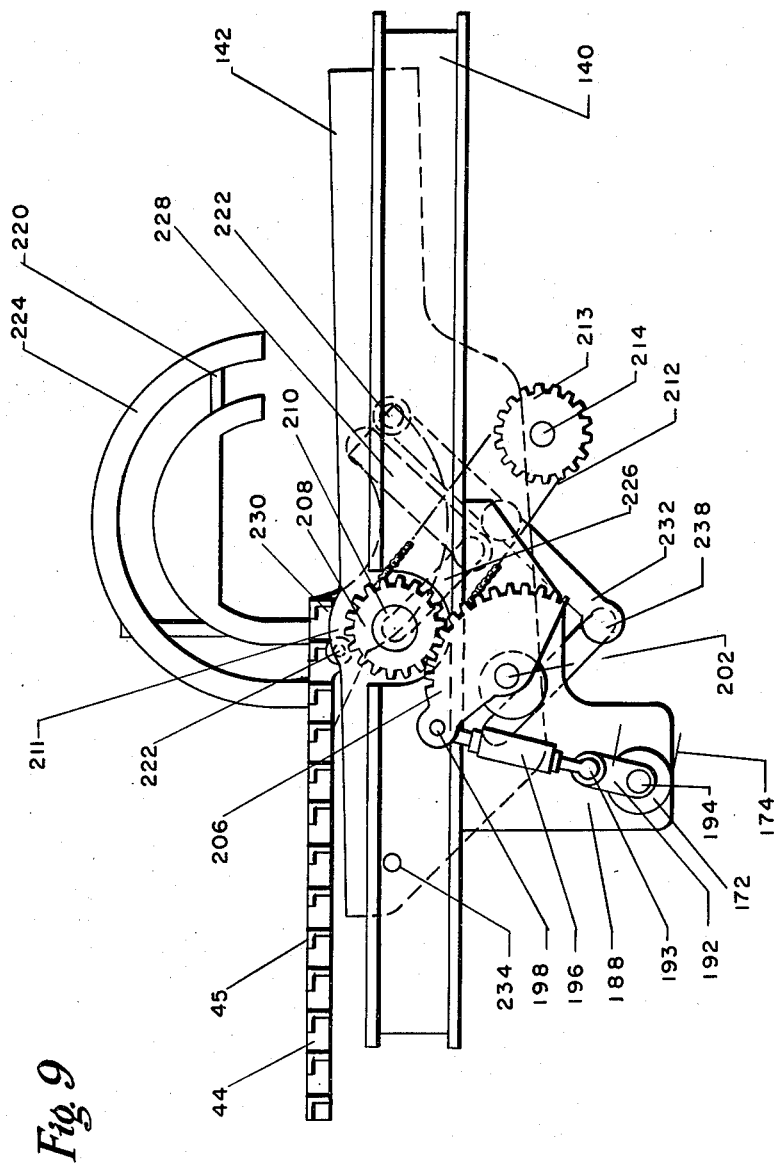
Figs. 9 and 10 are cross-sectional views taken along the crosswise direction of the apparatus, of the leg-folding mechanism showing the leg folder before and after the folding operation, respectively.
Figure 10:
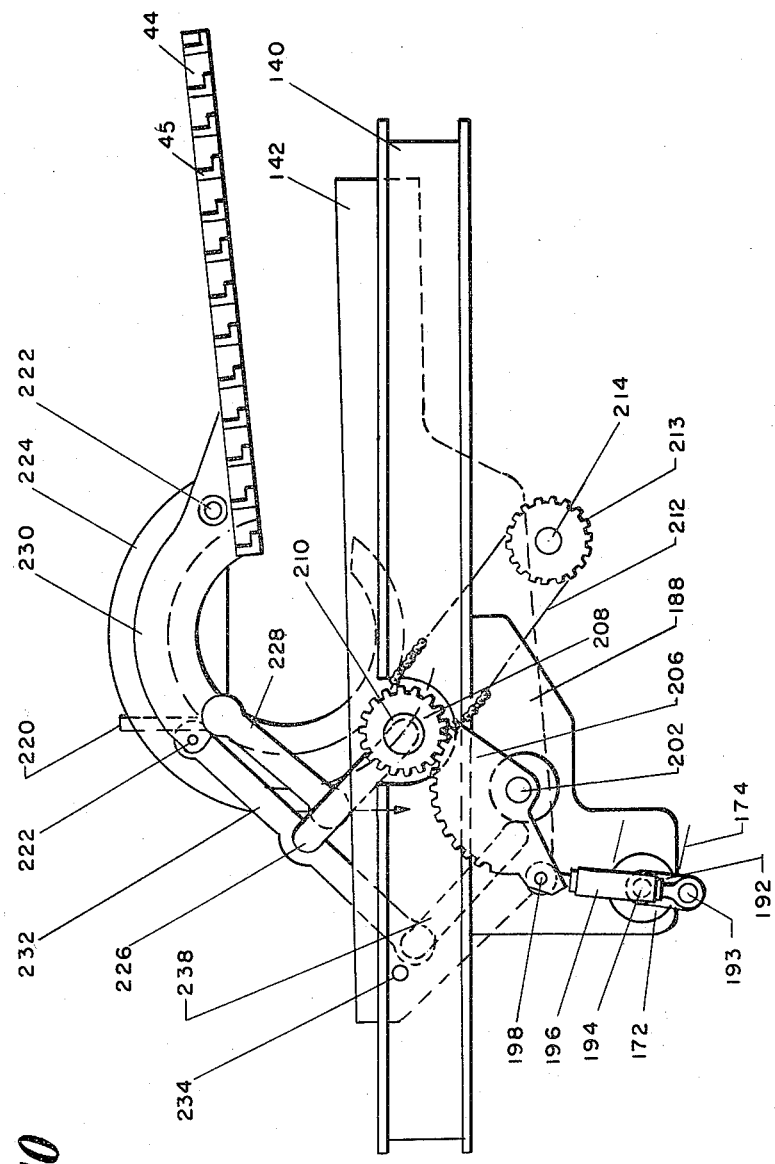

That portion of the folding mechanism which folds the leg of the hosiery into substantially one-half its original length is illustrated in detail in Figs. 7–10. Fig. 7 shows a cross-sectional view taken crosswise through the apparatus and illustrates the mechanism whereby this leg-folding apparatus can be adjusted to fold stockings of varying lengths. Fig. 8 is a top plan view of the leg folder while Figs. 9 and 10 are side views showing the leg folder in its two extreme positions, i.e., before the hosiery has been folded and after the folding has been accomplished.

Inasmuch as nylon hosiery are commonly manufactured in a number of lengths, it is important to be able to adjust the leg-folding mechanism so that any length of hosiery can be folded essentially in half. The way in which this is accomplished in the apparatus of this invention is shown in Fig. 7. The adjustment mechanism is made up of a hand crank 132 which rotates shaft 134, supported by plate 136 and suitable bearing housing 138. The actual folding mechanism is mounted in an outer movable mounting frame 140 and in an inner frame 142 which may be angularly moved with respect to outer frame 140 since it is attached only at one end to the outer frame 140 through pins 234. The outer frame 140 (and hence also inner frame 142) is free to move back and forth within predetermined distances on rollers 144 while the inner frame 142 is free to move angularly within frame 140 because of the connection of the two frames through pins 234. Shaft 134, by means of right angle gear 148, is connected to shaft 150 which in turn is permanently joined to yoke 152. The inner frame 142 has integral with its bottom portion positioning grooves 146 which are spaced apart to correspond with the distances through which the mechanism is moved to make the necessary adjustments in the final folding length of the hosiery and to correspond to the distances between the positioning pins 154 on yoke 152. Rotating hand crank 132 rotates shaft 134 and thus shaft 150 rotates yoke 152 lifting the inner frame and setting it down so that the positioning grooves 146 set on positioning pins 154. In the process of moving and positioning inner frame 152, outer frame 140 is also moved by virtue of the attachment of these two frames. A suitable block 156 is attached to the main apparatus frame to support the adjusting mechanism.

In order to lock the movable mounting for the folding mechanism in place, a solenoid 158 is provided. The solenoid 158 is comprised of a coil 159 and armature 164 and is mounted on a suitable mounting 160. Spring 162 forces the armature up when current to the solenoid is cut off, and the frame is being moved. A T-clamp 166 is fixed to the top of the armature 164 and is positioned to fit in one of grooves 168 located in a plate 169 attached across inner frame 142. Activation of solenoid 158 forces T-clamp 166 down into the appropriate groove 168, thus locking the frames in position.

The leg-folding mechanism is driven by leg and welt folder drive shaft 490 which is mechanically connected to star wheel 438 (see Fig. 18). Because the framework (outer frame 140 and inner frame 142) in which the folding mechanism is mounted is movable, it is necessary to design a driving mechanism for the leg folder which will allow the movable frame to assume different positions and at the same time provide for transmitting power from shaft 490 to the drive shaft 210 for the leg folder. The mechanism by which this is accomplished is illustrated in detail in Fig. 7. Shaft 490 and sprocket 494 are connected with drive sprocket 172 by means of chain 174. A series of four idler sprockets 176, mounted on pins 178 to apparatus frame (not shown) and two idler sprockets 177 mounted by pins 179 to tensioner arm 182, are provided as part of the mechanism for taking up any slack in chain 174. A cam surface 180 permanently mounted upon tensioner arm 182 is provided to engage with a cam follower 186. The tensioner arm 182 is rotatably mounted to the apparatus frame 183 through pin 184 while cam follower 186 is fixed through pin 190 to a support plate 188 which is integral with and a part of outer frame 140. The contact surface of cam 180 is so designed that as the outer frame 140 is moved toward the left (from its position in Fig. 7) the tensioner arm 182 is raised, thus raising idler sprockets 177 in relation to their position illustrated. In moving toward the left, the distance between shaft 490 and drive sprocket 172 increases thus requiring less slack in chain 174 to be taken up by idler sprockets 177. This adjustment is made when the idler sprockets 177 are moved upwardly as described.

Crank 192 is attached to drive sprocket 172 through pin 193. Crank 192 in turn is attached through pin 194 to an adjusting link 196 which at its upper end is attached to a sector gear 206 through pin 198. Adjusting link 196 thus provides the necessary means for adjusting the variable connection between drive sprocket 172 and sector gear 206 when it is desired to adjust the end positions of the folding action, i.e., the before-folding and after-folding positions of platform 44 (Figs. 7 and 8). Support shaft 202 is provided for sector gear 206. This shaft 202 passes outwardly from inner housing 142 through opening 200 in outer housing 140. Sector gear 206 in turn is used to drive gear 208 and hence main shaft 210 which intermittently rotates the leg folder as explained in detail below.

Turning now to Figs. 8, 9, and 10, the actual driving mechanism and the leg folder will be shown and discussed. Main shaft 210, as noted above, passes through outer frame 140 and inner frame 142 and is held by bearing support 211. This shaft 210 is connected with the main drive lever for the leg-folding mechanism described below.

Shaft 210 is connected by chain 212 to sprocket 213 and hence to counter shaft 214 which drives shaft 218 through chain 216. These make up a portion of the driving mechanisms of the folding device.

The interdigitated platform 44 on which the unfolded pair of hosiery rests is shown in Figs. 8 and 9 to be in the position before folding is begun and in Fig. 10 in the position it assumes after folding. In these figures, wherein like numbers refer to like elements, it will be seen that the leg folder 44 equipped with bars 45 is moved through a path determined by the guide track 224 in which rollers 222 move. A drive lever 226, a short flipper drive arm 228 and a long flipper drive arm 232, along with follower lever 238 make up the driving mechanism by which the leg folder assembly is moved in the path designed by the track 224. A connecting arm 230 serves to join the leg-folding platform 44 with this driving mechanism. Guide track 224 is supported by frame 220. Figs. 8, 9, and 10 illustrate how the inner frame 142 is connected pivotly into the outer mounting frame 140 only through pins 234. The unattached end of inner frame 142 actually rests on yoke 152 through positioning grooves 146. Frames 140 and 142 are locked in position by T-clamp 166 on the yoke 152 and positioning grooves 146 as previously described.

In operating the leg folder, shaft 490 (Fig. 7) is driven in an intermittent manner by star wheel 438 (see Fig. 18) and makes one revolution in one second, then dwells for the following second. Likewise drive sprocket 172 and drive crank 192 operate in the same intermittent manner at the same speed. Sector gear 206 is driven by drive crank 192 intermittently and reciprocatingly, and thus it rotates shaft 210, and likewise shafts 214 and 218, intermittently so that the folder arm 44 makes its complete movement through about 180° for folding during the first quarter of the cycle, and reverses and returns during the second quarter of the cycle. (The timing of the entire mechanism is discussed in detail below in Section XII and with reference to Fig. 21.)

Because of the relationship of the leg folder to the framework and because of its position in the appartus of this invention, the leg folder drive must be designed to move within its track without benefit of a central pivot point. The driving mechanism comprising the shafts, driving arms and levers described above achieves this unique type of movement of the leg folder.

It will be noted further that inner frame 142 is positioned within outer frame 140 at an angle, designated α in Fig. 8. If the hosiery were folded in half lengthwise to give a true 90° angle between the folded edge and the front line of the hosiery, the foot would extend almost completely beyond the front line, a result which would in turn require the entire foot to be folded back over the top or welt part of the hose. However, by first folding the leg at a small angle (preferably about 3°) it is possible to place a portion of the foot over the upper or welt so that the actual foot area which must be folded back to give an essentially rectangular shape to work with is substantially less than if this angular fold were not employed.

Figure 11:
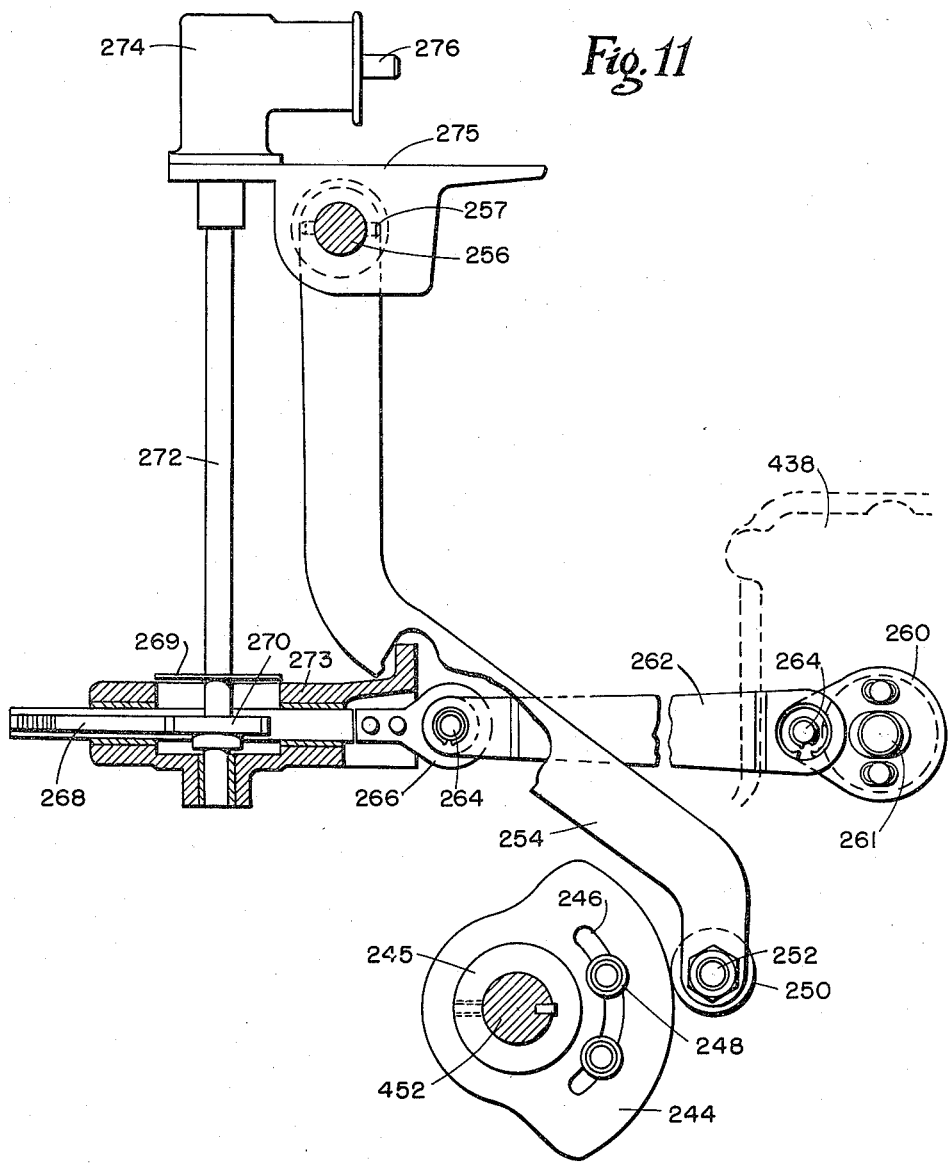
Fig. 11 is a cross-sectional view, taken along the crosswise direction of the apparatus, of a part of that portion of the first folder which folds the foot of the hose back onto the leg portion.
Figure 12:
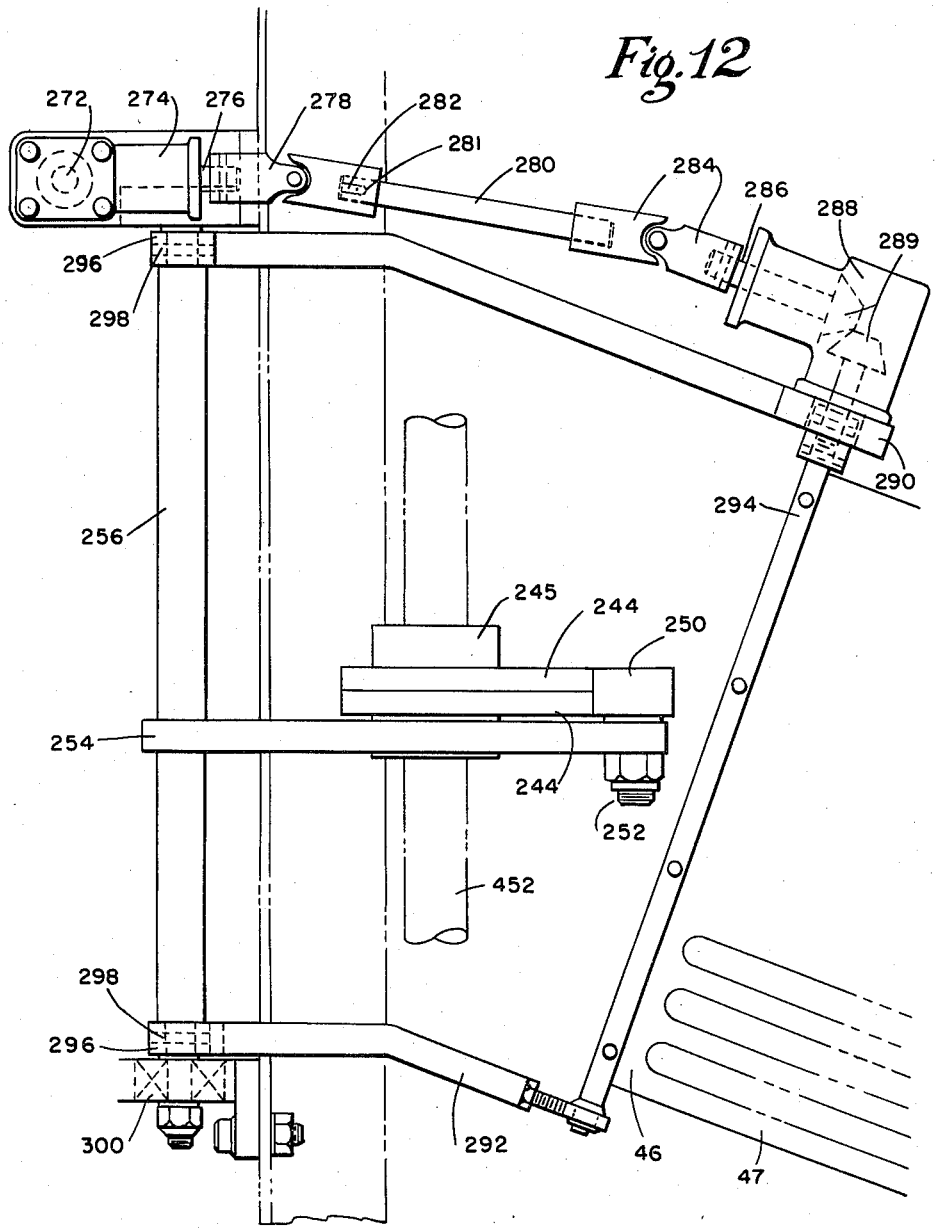
Fig. 12 is a top plan view of the foot folder of Fig. 11.

Figs. 11 and 12 illustrate the second portion of the first folding station (i.e., the foot-folding mechanism) in detail. Fig. 11 is a cross-sectional view of the foot-folder drive taken crosswise through the apparatus while Fig. 12 is a top plan view of the foot folder. In operating the foot-folding mechanism, it is necessary to impart to it two types of motions, i.e., an upward and downward motion permitting the foot folder to give proper clearance in turn, to the incoming hosiery during transport and to the leg folder during the latter's operation, and an angular motion to the foot-folder platform 46 so that it may fold the foot back over the hosiery once the hosiery has been essentially folded in half by the leg folder.

The upward and downward motion of the foot folder is achieved through cam 244 which, in this case, is actually a double cam having an adjusting slot 246 and adjusting screws 248. By moving the two cams with relationship to each other it is thus possible to adjust the length of the cam surface and hence to adjust the relative time intervals that the foot folder is in its raised and lowered positions.

Cam 244 is driven by main shaft 452 maintained thereon in hub 245. Cam follower 250, by means of pin 252, is connected with crank follower arm 254 which in turn is rigidly connected to foot folder pivot shaft 256 through pin 257.

The angular motion of the foot folder platform 46 is imparted by means of shaft 261 of star wheel 438 (see Fig. 18). The driving mechanism consists of crank 260 connected through connecting rod 262 and pins 264 to rack assembly 266. Rack assembly 266 is integral with rack 268 which engages a pinion gear 270, the latter in turn drives vertical shaft 272. Housing 273 for this driving mechanism is covered with a protective shield 269. Vertical shaft 272 is mechanically connected with a miter gear 274 to drive horizontal shaft 276.

Referring now to Fig. 12, the description may be continued with reference to the top plan view represented in that figure. Shaft 276 is connected with a universal joint 278 which in turn is connected through shaft 280 to a second universal joint 284. Provision is made by means of pin 281 and slot 282 for small changes in the effective length of shaft 280. The second universal joint 284 leads by shaft 286 to a second miter gear 288, the beveled gears 289 of the miter gear being shown in dotted lines. A long foot folder arm 290 and a short foot folder arm 292 connected by means of a folder shaft 294 make up the primary framework on which the foot folder platform 46 is rigidly mounted. The long foot folder arm 290 and short foot folder arm 292 are in turn rigidly attached through collars 296 and pins 298 to the foot folder pivot shaft 256. A suitable bearing block 300 and auxiliary attaching means for the various parts are also provided.

A preferred shape of the foot folder platform 46 is illustrated in Fig. 2. In this preferred embodiment the effect of bars is achieved by cutting out areas in a plastic plate to leave bars 47.

The foot folder must operate in such a manner as to be in its position close to the interdigitated bars of the machine table during the time which the leg folder platform 44 is moving through its arc to fold the legs of the hosiery and also during its own subsequent folding motion. This is achieved through the design of cams 244 which are driven by main shaft 452 at 30 r.p.m. Timing of the actual foot folding operation to take place after the legs of the hose are folded is achieved by star wheel 438 which is designed so that the foot folding is accomplished during the second quarter of the cycle. (See Figs. 18 and 21.)

After the foot has been folded over the folded leg, the foot folding mechanism returns through approximately 180° and remains in that position, being raised by the mechanism described previously only to give clearance for the stocking movement on the interdigitated bars.

VII. WELT FOLDING—STATION E (Fig. 13)

It is the purpose of the welt-folding mechanism to accomplish the final folding of the hosiery, an operation which consists of another lengthwise fold to reduce the length of the folded hosiery to approximately one fourth the length of the original unfolded hosiery. As explained above in connection with Section V and Fig. 2, inserts may be placed either before the first folding operation or subsequent to it. In any event the welt fold is accomplished after the insert has been placed and this fold in effect reduces the length of the hose to approximately the length of the insert.

The welt-folding platform 52 is similar in design to the leg-folding platform 44, except it is somewhat smaller and shorter since it handles only about half the length that the leg folder must handle. The welt-folder platform 52 is likewise formed of interdigitated bars 53 spaced apart.

The mechanism by which welt folding is accomplished is illustrated in Fig. 13, which shows two positions of the welt folders; before folding, and at the half-way point. After the final fold has been accomplished the welt-folding platform 52 has rotated to a point 180° from the position indicated by the dotted line in Fig. 13. This last position is not shown to simplify Fig. 13.

The welt-folding mechanism is essentially a four-bar linkage arrangement supplemented by driving and pushing mechanisms. It is mounted on a back plate 310 and has a crank shaft bearing block 312 and a drive lever support block 314. Tracing first the four-bar linkage, it may be seen to be made up of pivot link 316, guide arm 318 and bell crank pivot link 320. This linkage has grounded points at 322 and 324. The pivot point of the four-bar linkage is pin 326, while the remaining points are at 328 and 330. Pin 332 connects the bar crank pivot link 320 to the drive portion of the mechanism. The drive portion is made up of crank shaft 502 (see Fig. 18) and arm 336, which in turn is connected to rod 338, these completing the driving mechanism which is attached to bell crank pivot link 320.

The pushing portion of the mechanism is made up of arm 340, drive connecting rod 342, lever drive 344, follower link 346 and connecting link 348, which is permanently affixed or integral with the welt folder 52.

The welt folder is driven by shaft 502 which is coupled directly to leg folder shaft 490, the latter being controlled by star wheel 438 (see Fig. 18). The welt folder, like the leg folder, is designed to perform its folding operation during the first quarter of a cycle.

It will be seen that the three folding mechanisms of this invention are unique in that they are able to fold an item, namely a pair of hosiery or lingerie or a blouse, which is normally extremely difficult and often almost impossible to handle mechanically because of the nature of the material. The folders, i.e., leg, toe and welt, of the apparatus of this invention are able to accomplish the necessary folding operations because of their design and because of the speed at which they are operated.

Three important factors are involved in the folding apparatus of this invention. The first of these factors is the use of folding platforms which are partially open, i.e., the use of properly spaced bars; while the second factor, which is closely related to the first, is the maintaining of the proper proportion of open area to the solid area of the platform. The third factor is the angular rate of travel of the folding platforms.

The spaces between the bars of the platform essentially correspond to the bar sizes and spacings of the interdigitated stationary and moving bars of the transport mechanism. The open spaces of the folding platform should be of a proper size to allow the air pressure created in the actual folding operations (rotation of the folding platforms) to keep the item being folded in place on the solid portion of the platforms as they move. Moreover, the spacings should also be far enough apart so that the item being folded does not tend to cling to the folding platforms when the folding arms reverse their movements at the end of the folding operation. If the solid portions of the platform arms are too small, or if the openings are too large with respect to the area of the solid portions, the item being folded will sag through the openings, losing its alignment and causing it to be folded improperly. If the solid portions of the platform are too large with respect to the opening size, the item will cling to the folding platforms at the end of the movement of the folding platforms and become folded improperly when it finally breaks loose from the platforms.

The angular speed of the folding platforms must be related to, and at least partially determined by, the spacing of the solid portions of the platforms and the ratio of open to solid areas of the platforms. This angular speed will vary with these factors and with the item which is being folded; and it may be determined experimentally for each set of circumstances, i.e., platform design and item to be folded.

In the folding apparatus of this invention, which is designed primarily to handle nylon hosiery, it has been found convenient to make the bars approximately 5/8 inch wide and space them 7/8 inch apart. The width of the bars, the spacing between them and the rate of travel of the folding arms will vary according to the item to be folded. In using the apparatus of this invention for folding items other than nylon hosiery, the design and operational variables can be determined. It is, therefore, not meant to limit the dimensions and rate of operation to those specified in the example of handling nylon hosiery.

VIII. STAMPING— STATION F

*(Fig. 2)*

It is usually customary after the folding has been accomplished to transfer certain information onto the welt of one stocking of a pair of hosiery. This is commonly done by stamping a heat-transferable design on the uppermost welt. Such a design may consist of the manufacturer's name, trademark, size, and the like. A number of such stamping mechanisms are known and are suitable for incorporation into the mechanism of this invention.

A suitable stamping mechanism is shown in outline in Fig. 2. It consists of a main frame 56 in which are rotatably mounted, through pins 57, a supply roller 60 and a take-up roller 58. The prepared transfer design has been printed at intervals on a tissue paper, for example, roll 62. The tissue is periodically rolled so that a transfer design unit is in place over the folded hosiery as it passes from the welt folder, by means of the transport system described above, to a position directly under a heating unit (not shown) located within housing 56. In such an arrangement the transfer design on the paper roll 62 is periodically brought down to contact the welt and heat applied to its upper surface to transfer the design from the roll of tissue to the stocking welt. Subsequent to the transfer of the design the folded and now stamped pair of hosiery is moved into the final Delivery Station G to be placed upon the interdigitated delivery bars where they may be picked up for further processing.

There are known in the art a number of such automatic stamping devices. Any of these which can be incorporated into the overall drive and control mechanisms of this invention are suitable for use in the Stamping Station F.

IX. INSPECTION MECHANISM

*(Figs. 14–17)*

In order for a pair of hosiery to be processed properly in the apparatus of this invention it is necessary that it be placed upon the feeder or upon a pick-up tray (whichever is used) in a manner so that the pair of hose is in proper alignment. It is therefore necessary to provide an inspection system to determine whether or not this proper alignment is achieved. If the alignment is proper, the subsequent mechanisms will be permitted to operate in the manner described above for the individual station operations. If, on the other hand, the alignment is not proper, certain operations must be stopped or modified to prevent any subsequent mishandling of the hosiery or the introduction of unused tags and inserts into the apparatus.

The inspection mechanism is illustrated in Figs. 14–17. Figs. 14 and 15 show the means whereby the inspection head shaft, on which the inspection heads are mounted, is rotated to raise and lower the inspection heads as succeeding pairs of hosiery pass under it.

In Figs. 14 and 15, cam 360 is mounted on main shaft 452 through suitable support 362. This cam 360 imparts up and down motion to a vertical rod 374. This is accomplished through cam follower 364, arms 366 and 368, which are rigidly positioned with respect to each other and rotated about pin 370. Pin 370 is in turn pivotly mounted through bearing 371 on a support plate 372, fixed to the upright 382. Vertical rod 374 is moved up and down through a distance designated $\beta$. In moving through this distance $\beta$, drive rod 374 imparts a partial turning motion to inspection head shaft 378 through arm 376 which is rigidly connected to shaft 378, and attached to vertical rod 374 through bolt 375. Shaft 378 is permitted to rotate in housing 380 which is also attached to main frame 382 by a suitable device such as bolt 383. Attached to the other side of frame 382 and running lengthwise across and positioned above the forward position of the transport mechanism is an inspection head bridge 384 (see Fig. 2). Suitable connections, such as screws 385, fix bridge 384 rigidly to the uprights of the apparatus and in the required position above the interdigitated bars of the machine table.

Figures 16, 17:
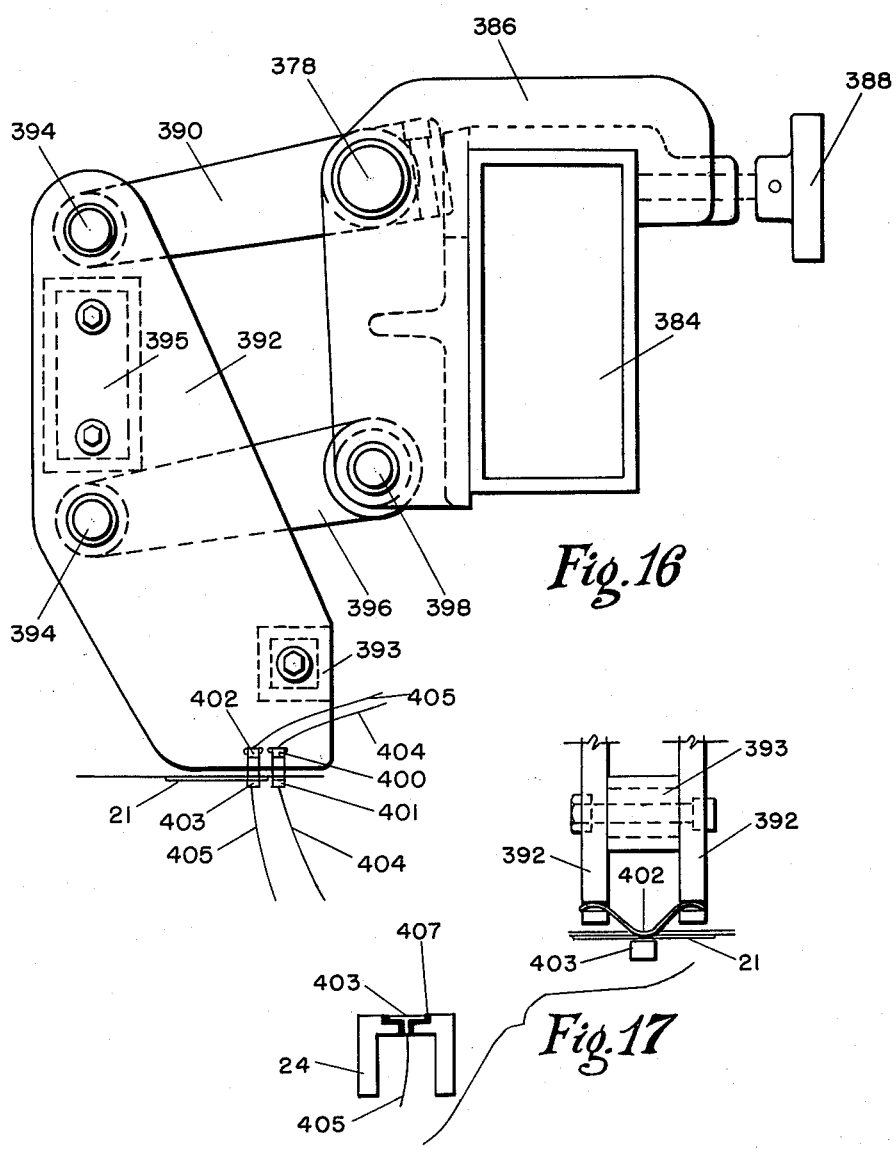
Figs. 16 and 17 are detailed drawings of one of the inspection heads of the inspection system.

Referring now to Figs. 16 and 17, it will be seen how inspection head bridge 384 supports mounting brackets 386 which are slideable on bridge 384 and which are locked into positon thereon by adjusting screw 388. Main inspection head shaft 378 effects vertical motion of sensing heads through arm 390 and pin 394. The three sensing heads are actually formed of two parallel non-conducting holders 392 (see Fig. 17) which are spaced apart by spacers 393 and 395, shown in the dotted line in Fig. 16. The sensing heads are pivotly linked by parallel arms 390 and 396 to support brackets 386. The support brackets, and thus the sensing head, are positioned along the bridge piece 384 so each head is directly over one of three of the interdigitated bars that have contact strips 401 and 403 embedded in them.

The sensing heads carry a forward contact spring 400 and an after contact spring 402. Positioned directly under these is a forward contact strip 401 and an after contact strip 403. These contact strips 401 and 403 are embedded flush into an interdigitated bar 24 and insulated from the bar by suitable electrical insulation 407 (see detailed section of Fig. 17). Wires 404 lead from the forward contact spring 400 and forward contact strip 401 to a relay (see Fig. 19) and wires 405 lead from the after contact spring 402 and after contact strip 403 to another relay (see Fig. 19). During the transport portion of the machine cycle, the sensing heads are held in an elevated position by the cam operated linkage (Figs. 14 and 15) acting through the aforementioned parallel arms 390 and 396. When the hosiery has arrived into position in the inspection station, the linkage shown in Figs. 14 and 15 causes the three heads to descend simultaneously until the contact springs make contact with the stocking and/or the contact strips 401 and 403.

A partial end view of this sensing system is shown in Fig. 17 wherein like numbers refer to like parts as in Fig. 16.

Figure 19:
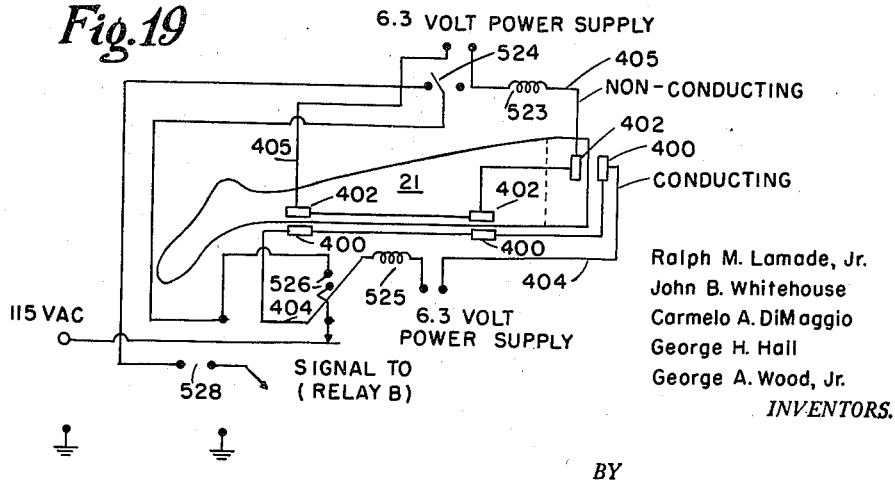
Fig. 19 is a schematic wiring diagram for the three inspection heads.

Three sensing mechanisms, such as illustrated in Fig. 16, are provided (see Fig. 19). Two of them determine the alignment of the long, straight (or front) portion of the hosiery, while the third checks the alignment of the welt so that it may pass properly through the tagging mechanism.

In the operation of the sensing head the hosiery is considered to be in proper alignment if the front edge separates the after contact spring 402 from the after contact strip 403 (Fig. 16) and does not separate the forward contact spring 400 from the forward contact strip 401. If these requirements are met for the hosiery position with respect to the two sensing heads used to determine the alignment of the forward, or long straight, edge of the hosiery, the circuit is broken between elements 402 and 403 but not between elements 400 and 401. Under such circumstances a specified signal will be fed into an electric memory system which in turn will control the operation of the mechanisms of the various stations as described in detail in Section XI below. If, on the other hand, the forward edge of the hosiery is not in a position to break contact between the elements 402 and 403, i.e., is too far back along the transport mechanism; or if the hosiery are so positioned that they are too far forward and hence also break the contact between 400 and 401, this information fed into the memory system will alter certain operations along the subsequent stations. More particularly, a signal of this type will halt the tagging, insert, and stamping mechanisms. The operation of the apparatus of this invention will be discussed below in detail with respect to the two types of signals which can be transmitted by the inspection heads and with reference to Figs. 19 and 20.

X. DRIVING MECHANISM FOR APPARATUS

(Fig. 18)

Fig. 18 is a top-plan view of the driving mechanism, along with the associated shafts and auxiliary equipment, used in the operation of the various stations of the apparatus of this invention. In order to present a clear picture of this portion of the apparatus, Fig. 18 does not include the apparatus of the various stations but their positions are related to this figure by indicating the shafts and connections used to drive them. In order to present this driving mechanism in one integrated drawing, some of the shafts have been shortened and hence the relative arrangements and locations of certain gears, chains, etc. have been somewhat changed but this, of course, does not affect the overall description.

In Fig. 18 it will be seen that there is provided a main motor 410 having two main drive chains 412 and 414 connecting the main motor 410 to the various shafts. Inasmuch as the shaft of motor 410 rotates at 225 r.p.m., and since it is required to drive two of the primary shafts at 30 r.p.m., reduction gears must be provided as described below.

Chain 412, through sprocket 413, drives a shaft 415 which passes through miter gear 416. Shaft 415 is coupled by means of suitable couplings 448 to another shaft 419 and then to the main shaft 420 of star wheel 422 through coupling 418. Star wheel 422 contains a reduction gear portion 423 and a conventional star wheel portion 424. From this latter part shaft 425 is driven and is available for connection with the intermediate drive shaft for a feeder if a feeder is to be used. Likewise, drive 426 is available for the feeder if so desired. Shafts 427 from star wheel 422 are connected by means of chains 94 to sprockets 93 and shafts 91 which effect the movement of the transport mechanism (see Fig. 3) described above.

From miter gears 416 there is also driven shaft 429 and shaft 430, the latter two being connected by coupling 428. Shaft 430 in turn drives the input shaft 436 of a second star wheel 438. Suitable sprockets 432 and 434 are provided in this arrangement. This second star wheel 438 is also divided into a reduction gear portion 440 and a conventional star wheel portion 442. The driving mechanisms supplied by the star wheel portion 442 will be discussed in detail below.

Turning now to shaft 444, which extends from the reduction gear portion of star wheel 438, it will be seen that it drives sprocket 446, chain 448 and sprocket 450, which is permanently affixed to the main shaft 452. A number of operations are driven from this main shaft 452 which is supported along its lengths by suitable supports 454 and bearing blocks 456.

Beginning at the forward end of shaft 452 there is first cam 360, which controls the up and down motion of the inspection head (see Fig. 14). Next, there is located on main shaft 452 a drive sprocket 458, which is connected by chain 459 to sprocket 460, located on a jack shaft 461.

Suitable supports and bearings are indicated at 455 and 457 for this jack shaft. The purpose of this arrangement is to control the operation of the tagging mechanism in Station B, for it has been found desirable that if the sensing head indicates that a pair of hose is not in proper alignment, a tag should not be cut off and permitted to fall into the equipment and remain unused. For this reason the jack shaft carries a one-revolution clutch 462, the details of which are not shown since it is standard commercial equipment. The clutch 462 is actuated by a solenoid (details not shown) which permits rotation of the jack shaft 461 when a pair of hose is in proper alignment, but which engages the clutch and hence prevents rotation of the jack shaft 461 when an error signal reaches it. Jack shaft 461 drives sprocket 464 and chain 466, which in turn is connected to the main cam shaft of the tagging mechanism (for example to shaft 74 of Fig. 8 of U.S. Serial No. 736,571, a co-pending application filed in the names of Carmelo DiMaggio, James W. Healy and Ralph M. Lamade, Jr. on May 20, 1958, for "Tagging Apparatus").

There are also provided on main shaft 452 two sprockets 468 and accompanying chain drives 469, each of which leads to the cam shaft of each of the two insert feeders provided (see Fig. 6). One of these, shown to be part of sprocket 450, which is used to drive main shaft 452 is associated with the insert mechanism of Station C, while the other is shown to be in a position to provide power to the insert mechanism located at Station C′, described in detail above in Section V.

The foot folder cam 244 (see Figs. 11 and 12) is attached directly to main shaft 452, thus main shaft 452 is used to give the foot folder its up and down motion required to avoid contact with the stocking being transported, as described above.

There are also mounted upon main shaft 452 five cams each of which has associated with it a mounting hub 471. These five cams are connected with the timing and control mechanism of the apparatus. Reading from left to right these are: cam 470, which is connected with a counting mechanism (described below); cam 472, which controls the read out for the inspection head; cam 474, which controls the deck pole; cam 476, which indexes the stepping switch and limits the stopped position of the folding devices; and cam 478, which times the vacuum on-off cycle for the insert mechanisms. Associated with each of these cams is a snap-action switch 473 which is actuated by a roller 475 which intermittently strikes the surface of its associated cam. The operation and timing of these cams will be described in detail below.

In order to count the number of perfectly processed pairs of hosiery put out by the apparatus of this invention, a counting pulse device is associated with the tagging mechanism since this mechanism receives error and no-error signals. The counting mechanism includes timing cam 470, which periodically engages a snap-action switch 473a. This switch is in turn connected with the solenoid (not shown) associated with the tagging mechanism. The timing cam 470 periodically activates the switch 473a at a time coordinated with that time when the solenoid receives an error or no-error signal. A no-error signal is a positive signal which energizes the tagging clutch solenoid and which (since the switch is closed) goes to a counter as a pulse to record the travel of a satisfactorily aligned pair of hosiery through the apparatus.

Finally, main shaft 452 is used to drive the rear transport mechanism, which consists of a modification of the transport mechanism described in Section II above. In this modification (not separately illustrated) cam shaft 70 (see Fig. 3) is driven directly by the driving mechanism shown in Fig. 18. This means that drive gear 92 and its associated parts and driven gear 90 and its associated parts are eliminated. Cam shaft 70 of the transport mechanism (see Fig. 3) is driven by means of shaft 482, which is coupled to main shaft 452 by means of coupling 480. Miter gear 484 and shaft 486, which passes through two universal joints 488, make up the connections between shaft 452 and cam shaft 70.

Returning now to the actual star wheel portion 442 of star wheel 438, it will be seen that it is used to provide the angular motion to the foot folder by means of shaft 261 and to operate the leg and welt folders by means of shaft 493.

Figure 21:
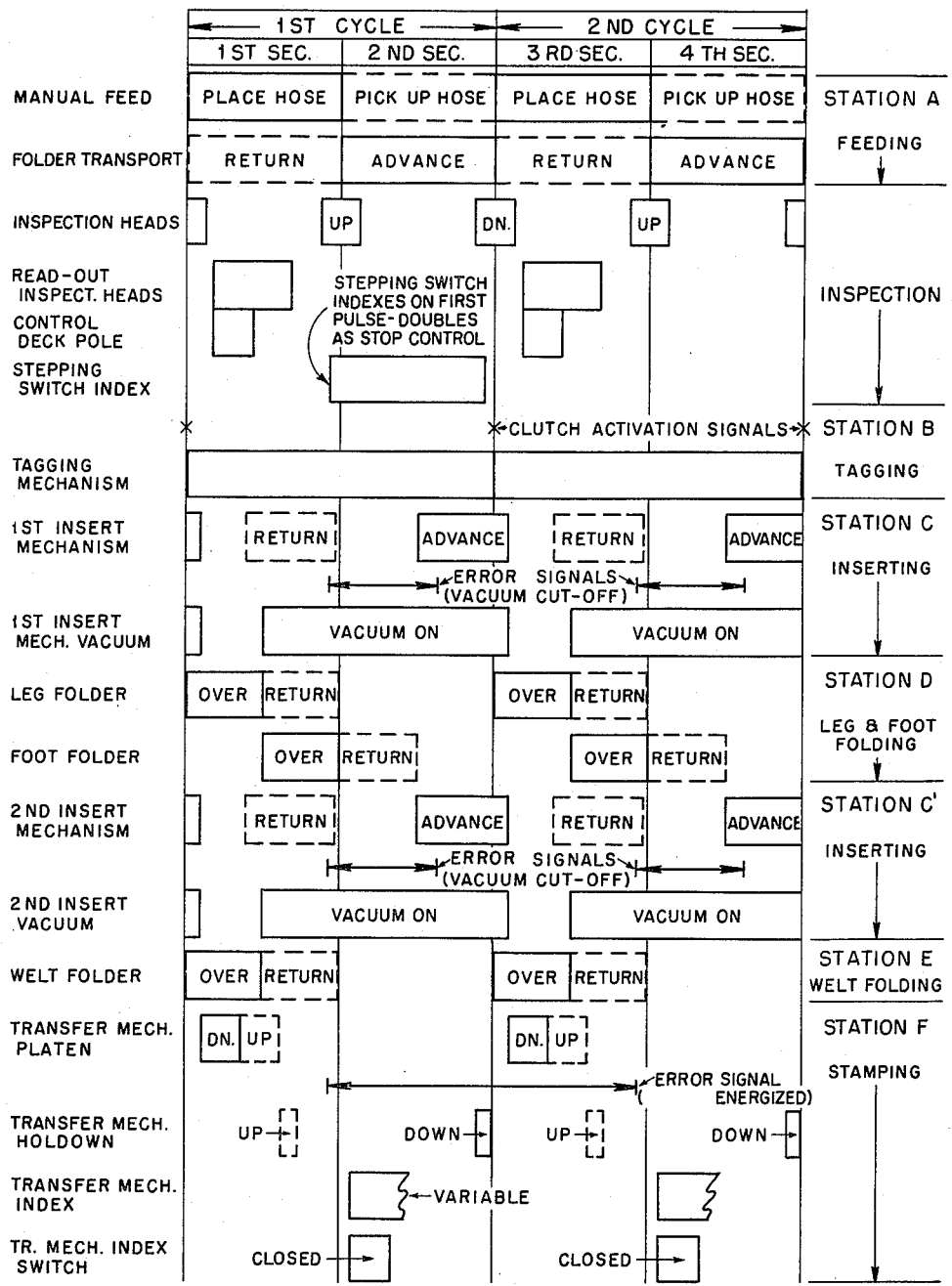
Fig. 21 is a diagrammatic representation of the timing of two complete cycles of operation of the apparatus showing the relationships among the various operations of the stations and the inspection and transport mechanisms.

The foot folder drive is, as discussed above, intermittent, and every revolution of the star wheel shaft 261 constitutes one-half cycle and the shaft dwells during the second half of the cycle (see Fig. 21). Shaft 261 in turn drives crank 260, and hence rack 268 and vertical shaft 272 which rotates foot folder pivot shaft 256 imparting the required angular motion of foot folder 46 (see Figs. 11 and 12). The motion of the foot folder shaft occurs one-quarter cycle later than the motion of the leg and welt-folder drive shaft described below.

The leg- and welt-folder drive shaft 490 is driven by shaft 493 of the star wheel and coupled thereto by coupling 492. On this leg- and welt-folder drive shaft 490 is located a drive sprocket 494 and associated with it is chain drive 174 which leads to the main drive shaft 210 of the leg folder (see Figs. 8, 9 and 10). This leg- and welt-folder shaft 490 is positioned by suitable bearing supports 498 and is coupled to the welt folder shaft 502 through coupler 500. This welt-folder shaft rotates the welt folder as shown in Fig. 13.

Finally, a drive must be provided to operate the transfer mechanism. This is accomplished through chain 414, sprocket 504 and shaft 506, which is mounted in bearing supports 508. Shaft 506 is in turn connected with shaft 516 through sprockets 510 and 514 and chain 512. Drive shaft 520 is associated with the main drive of the transfer mechanism (generally indicated at 522) and is in turn connected with shaft 516 through coupling 518.

Figure 20:
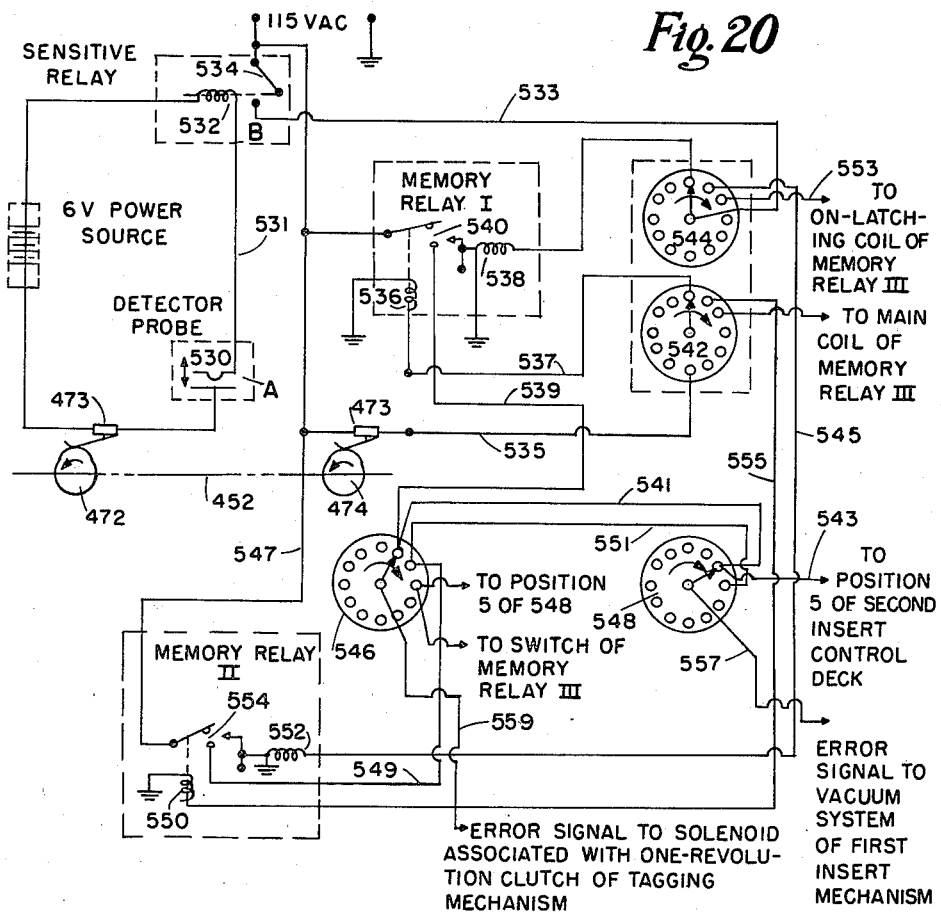
Fig. 20 is a simplified schematic wiring diagram for the control of the apparatus.

XI. CONTROL MECHANISM (Figs. 19 and 20)

It is necessary that certain of the operations taking place at the different stations of the apparatus be modified or stopped when a pair of hosiery is fed into the apparatus in improper alignment. Thus, it is necessary to prevent a tag from being attached to the hosiery, an insert from being placed into position, and a design from being stamped on the welt of the stocking. The folding steps, on the other hand, must be continued in order that the improperly aligned pair of hosiery may be carried through the machine to the discharge end where that pair is removed from further operations either mechanically, manually, or pneumatically.

Controls for the three operations which must be modified or stopped are effected by the one-revolution clutch 462 which prevents or permits the tagging mechanism from operating; by a solenoid valve on the vacuum line to the pick-up heads on the insert mechanism; and by the non-actuation of the mechanism which drives the transfer application unit.

It is necessary to employ a memory device to halt or actuate the various mechanisms in the proper sequence. Inasmuch as the operations at the stations are of such a nature that the properly stored signals can be fed out in a consecutive nature, an electrical unit is incorporated for this control. The electrical device in this case consists of a multideck stepping switch with 12 positions for each deck and 12 separate latching relays. These units are partially shown on Fig. 20, the memory relays I and II representing the latching relays. For simplicity there are only three decks of the multi-deck stepping switch shown. These three decks of the stepping switch, which are shown for illustration, are the inspection deck, the main control deck, and the tagging deck. There are decks similar to the tagging deck provided for each of the insert mechanisms for the stamping mechanism and for the first operation to be performed in the packaging machine which is not a part of this invention. Further decks can be added to this mechanism if they are necessary for any subsequent operations. There are twelve memory relays, corresponding to the twelve positions on each deck of the stepping switch. Thus, one can relate the memory device to the mechanical unit in the following fashion: the decks of the stepping switch correspond to the various stations of the machine and the memory relays correspond to the pairs of hosiery being processed by the machine. When a pair of hosiery is fed into the machine, it is inspected and the no-error or error signal is fed into the memory relay corresponding to that pair of hosiery. This relay is then read out by the control system through the position on the deck which corresponds to the station in which the pair of hosiery is then being processed. As the pair of hosiery moves through the successive stations, the poles, of which there is one per deck and which are connected together by virtue of being mounted on a common shaft, are rotated to the successive positions on each deck, thereby connecting each memory relay to the mechanism that controls the operation being performed. The pole shaft is operated by a ratcheting solenoid and receives a signal from cam 476 through switch 473, shown in Fig. 18.

The memory unit will always read an error until a good or no-error signal is fed into it. Thus, if the machine is run with no stockings being in it or being fed into it, or when it is run to finish out one lot of hosiery or to start another lot, the controlled stations will operate the same as they would for an improperly aligned pair of hosiery.

The initial signal is generated at the inspection heads shown in Figs. 16 and 17. This signal is sent to the memory relay in the fashion shown in Fig. 19, wherein like numbers refer to like elements in Figs. 16 and 17.

It will be seen in Fig. 19 that proper alignment is determined by the three sets of inspection heads, each set being made up of a forward contact spring 400 and an after contact spring 402. If the pair of hosiery lies on the transport mechanism so that it is interposed between the after contact springs 402 and the after contact strips 403 positioned directly under them (not shown) and in a position not to extend under the forward contact springs 400, then the proper conditions exist in the electrical system illustrated in Fig. 19 to transmit a signal to the inspection deck pole through a sensitive relay (relay B of Fig. 20).

When proper alignment is achieved, as illustrated in Fig. 19, no current can be transmitted from the after contact springs 402 to the after contact strips and hence the circuit represented by lines 405 must be non-conducting. On the other hand, because the hosiery is not interposed between the forward contact springs 400 and forward contact strips positioned directly below them, metal to metal contact is made and current is permitted to flow in lines 404 to give a conducting circuit. Under these circumstances switches 524 and 526 are closed and power is transmitted to result in the generation of a signal to the main control system. The circuit of Fig. 19 also includes auxiliary devices such as resistors 523 and 525 and switch 528.

Any other arrangement of conditions which makes circuit 405 conducting or circuit 404 non-conducting will be seen to not result in the transmission of a signal to the main controls. Thus, the transmission of current to the control mechanism of Fig. 20 is equivalent to a no-error signal, while the transmission of a no current is the equivalent of introducing an error signal into the memory relay.

A simplified schematic diagram of a portion of the electrical control of the apparatus is shown in Fig. 20. In general the controls will be seen to be made up of the two cams 472 and 474 which, as explained above, are located on the main shaft 452 (see Fig. 18). These cams periodically actuate the snap-action switches 473 associated with them. Cam 472 is used to periodically actuate its switch while the contact 530 of inspection head relay A is closed, permitting current to flow in circuit 531 thus activating coil 532 to close the sensitive relay B. At the same time, if a signal is transmitted from the inspection head device illustrated in Fig. 19, switch 534 is closed which in turn closes circuit 533 and permits a current to pass through the inspection deck 544 and to energize the on-latching coil 538 of the first memory relay I. Simultaneously, cam 474 has actuated the switch 473 associated with it and has permitted current to pass in circuit 535 by way of the main control deck 542 to energize the main coil 536 of memory relay I through circuit 537. Because of the energization of this main coil 536, switch 540 is held down, but if a no-error signal is received by virtue of the closing of switch 534, as described above, the energization of the on-latching coil 538 opens this closed switch 540 and prevents the passing of current through circuit 539.

It will be seen from this description that if switch 534 is not closed, that is, if the device receives an error signal, no current will pass through circuit 533, on-latching coil 538 will not be energized and switch 540 will not be opened. In this case current will pass through circuit 539 and to the second station of the deck 546 which controls the operation of the tagging mechanism; and because the pole of the tagging mechanism is moved to the second position of that deck, the circuit will be completed through this switching mechanism to send an error signal by means of circuit 559 to the solenoid associated with the one-revolution clutch of the tagging mechanism. Likewise circuit 541 connecting the second position of the tagging mechanism deck with the third position of the first insert mechanism deck will transmit an error signal by way of circuit 557 to the vacuum system of the insert mechanism which will have as its ultimate effect the cutting off of vacuum and hence the prevention of the pickup of an insert when that pair of hosiery reaches Station C (first insert station). This system is continued in a like manner for all of the operations of the apparatus with the exception that blanks are left for Station D and Station E. These stations are left uncontrolled because it is not necessary to stop their motions regardless of whether the improperly aligned stockings are permitted to pass through these stations or if they are removed prior to these operations. The presence of these two blanks requires that provision be left in the timing mechanism for the position which they occupy in the apparatus. Thus, as noted in Fig. 20, circuit 543 is seen to go from position 3 of the first insert mechanism control deck to position 5 of the second insert mechanism control deck, leaving position 4 of a blank control deck for the first, or leg and foot folding, operation.

It will be appreciated that in the control system shown in Fig. 20 in order to provide a control deck having 12 switch positions, it is necessary to provide 12 memory relays which are equivalent to memory relays I and II illustrated. Each of these memory relays works in precisely the same manner as that described for memory relay I, that is, on-latching coil 552 of relay II operates in the same manner as on-latching coil 538, except that it is connected with the second position of the inspection deck 544 through circuit 545. Likewise the corresponding on-latching coils of the successive memory relays will be connected with the successive positions of the inspection deck 544 such as by circuit 553 which leads to memory relay III (not shown further). In a similar manner, main coil 550 of memory relay II, equivalent in operation to main coil 536 of memory relay I, is connected to the second position of the main control deck 542 through circuit 555. Each memory relay is also, of course, connected in series as through circuit 547 with the switch 473 associated with cam 474; and the switches (such as 540 and 554) of the memory relays are connected as through circuit 549 with successive positions of the controls for the various operations, each one being the next consecutive position from that of the preceding control, leaving, of course, the necessary blanks as described above. Each position of each deck is also connected to the next position of the following deck as shown where circuit 551 connects the third position of the tagging mechanism deck 546 with the fourth position of the first insert mechanism deck 548.

It will be seen from the description of this control system that each of the memory relays stores the necessary information to impart to the successive control decks that information required to cause it to perform the proper operation on each pair of hosiery as it advances from station to station.

XII. TIMING AND OPERATION

*(Fig. 21)*

The control mechanism described in Section XI above effects the proper timing and control of the operations in the apparatus. Fig. 21 is a diagrammatic representation of the timing of the operations at the stations and of the inspection and control mechanisms. A typical cycle for the apparatus of this invention is of two seconds duration, and Fig. 21 illustrates the timing for two such cycles. Of course, cycles of different durations are also possible.

The timing shown in Fig. 21 is given in what might be considered a chronological order, although it will be appreciated that once sufficient pairs of hosiery have been fed into the apparatus the operations are, of course, taking place simultaneously.

Using the timing schedule of Fig. 21, it is possible to trace the progress of a pair of hosiery through the apparatus of this invention, from the time that it is placed on the feeder by an operator until the time it arrives at Station G which is the delivery station. In this description reference may also be had to Fig. 2.

Automatic feeding devices may be used or the pair of hosiery may be fed manually to the first interdigitated stationary bars from which it is picked up by the transport mechanism. In this illustration, during the first second of the two-second cycle, time is allowed for the operator to manually place a pair of hosiery 21 on the stationary bars 24 (see Fig. 2) to align them within the limits 23 indicated on the bars. During the second half of the cycle the moving interdigitated bars 26 of the transport mechanism (in position below the stationary interdigitated bars 24) rise upwardly beyond the level of the stationary interdigitated bars and pick up the pair of hosiery to move it into position under the inspection heads attached to bridge 384.

During the last part of the advancement and transfer step carried out by the transport mechanism, the inspection heads 392 are lowered so as to be in position to check the pair of hosiery to determine whether or not it is in proper alignment. Thus, during the period that the inspection heads are in their down position, cams 472 and 474 activate their associated switches so that the information that has been obtained in the inspection head, by virtue of the circuit arrangement shown in Fig. 19, can be fed out to the control mechanism described in connection with Fig. 20.

During the period of time that the inspection heads are down and the information derived therefrom is being transmitted to the control system, the transport mechanism is returning to pickup and subsequently advance another pair of hose. As explained in connection with the discussion of Figs. 3, 4 and 5, the return of the movable interdigitated bars of the transport mechanism is accomplished by moving them forward and approximately ¼ inch below the level of the fixed interdigitated bars.

The stepping switch or pole shaft index is activated by means of cam 476 (Fig. 18) which has the combined purpose of (a) indexing the stepping switch of the memory system and (b) limiting normal stopping of the apparatus to that portion of the cycle when the folders are in their dwell positions so that folding operations are not interrupted. The tagging mechanism is continually in operation, as will be seen in Fig. 2, except that error and no-error signals are transmitted to the one-revolution clutch by means of circuit 539 of Fig. 20. As explained previously, if no signal is transmitted, it is equivalent to a no-error signal and the clutch is activated by means of a solenoid which permits the jack shaft 461 to transmit power through chain 466 to the tagging mechanism, thus permitting a tag to be attached to the welt of the hose.

In operating the insert mechanism at Stations C and C', it is necessary not only to control the action of the insert mechanism but to control the vacuum used in connection with the pick-up cups 38 (Fig. 2) of the insert mechanism. It is by controlling the vacuum that the operation of the insert mechanism can be halted as the memory relay, which controls this step, transmits an error signal by way of circuit 539 (Fig. 20) to cut off the vacuum supply by closing a solenoid valve and hence prevents the picking up of an insert. Fig. 21 indicates the time at which this error signal is sent and the extent at which the vacuum is cut off. The control of the second insert mechanism in Station C' is identical to the first insert mechanism in Station C.

It will be seen from Fig. 21 that the leg folder moves through its required folding arc during the first quarter of the cycle and after it has folded the pair of hosiery in half, the foot folder which has previously moved downwardly into its operating position rotates through 180° during the second quarter of the cycle. Thus the hosiery has been folded in half and the foot folded over the leg portion so that the resulting pair of hosiery is in an essentially rectangular shape. The partially folded pair of hoisery is then moved on by means of the transport mechanism through the second insert station where an insert is laid on if the insert has not been placed on the unfolded hosiery. Then at the Welt-Folding Station (Station E) the welt folder moves through its arc of travel during the first quarter of the cycle to the final folding of the welt over and on top of the insert.

Finally, the transfer mechanism holddown is moved downwardly into position against the folded pair of hosiery. Subsequently, the transfer mechanism heated platen is brought down into position to contact the tape and welt and transfer the design by heat to the welt. The transfer tape indexing time is shown to be variable because the rate at which the tape-up roll turns is constant while the size of the roll varies with the amount of tape rolled on it, and because the spacing between the successive transfers on the tape varies from roll to roll as well as within any roll. Thus, the speed of indexing varies and is indicated by a broken line on the timing diagram.

It will be evident from the above description and drawings that the apparatus of this invention provides a novel automatic device for processing sheer, or normally difficult to handle articles. Moreover, the apparatus is adaptable to various articles of varying sizes. This apparatus is reliable, for through its control and timing mechanisms it is capable of distinguishing properly and improperly aligned articles and of rejecting the latter in a way to prevent any malfunction of the individual operations.

The apparatus of this invention is applicable to the handling of sheer articles primarily because of the unique transport mechanism without which the successive operating stations could not function as required. Moreover, the folding apparatus, the insert-placement mechanisms and the memory control are particularly adapted to handling sheer articles.

As will be apparent to one skilled in the art, the separate operations detailed above are individually capable of performance with a variety of devices. For example, the tagging, insert placement and stamping means may be accomplished by other devices. Thus the present invention is not limited to the apparatus shown for the purpose of illustration, but comprises all modifications and equivalents falling within the scope of the appended claims.

We claim:

1. Apparatus for automatically processing a pair of hosiery, comprising feeder means adapted to receive a pair of hosiery aligned within predetermined limits with respect to said feeder means, tagging means for placing a tag in a predetermined location along the top edge of said hosiery, first folding means incorporating leg-folding means for folding said hosiery approximately in half lengthwise and foot-folding means adapted to fold back the foot portion of said hosiery, second folding means adapted to fold said hosiery approximately in half again, insert-placement means adapted to provide a paper interliner between the folds in said hosiery, stamping means adapted to apply a design to the welt of said hosiery, transport means operating between and in cooperation with said feeding means, tagging means, first and second folding means, insert-placement means and stamping means and arranged to transport said hosiery successively from each one of said means to each succeeding one of said means, and mechanical driving means adapted to drive, control and time the operation of each of the aforesaid means whereby said article is processed, transported and delivered.

2. Apparatus for automatically processing a pair of hosiery, comprising feeder means adapted to receive a pair of hosiery aligned within predetermined limits with respect to said feeder means, tagging means for placing a tag in a predetermined location along the top edge of said hosiery, first folding means incorporating leg-folding means for folding said hosiery approximately in half lengthwise and foot-folding means adapted to fold back the foot portion of said hosiery against the folded leg portion, second folding means adapted to fold said hosiery approximately in half again, insert-placement means adapted to provide a paper interliner between the folds in said hosiery, stamping means adapted to apply a design on the welt of said hosiery, interdigitated transport means operating between and in cooperation with said feeding means, tagging means, first and second folding means, insert-placement means and stamping means and arranged to transport said hosiery successively from each one of said means to each succeeding one of said means, sensing means to determine the achievement of the alignment of said hosiery, operation control means associated with said sensing means and adapted to control the operation of said tagging, insert-placement and stamping means, and mechanical driving means adapted to drive, control and time the operation of each of the aforesaid means whereby said article is processed, transported and delivered.

3. Apparatus in accordance with claim 2 further characterized by having adjusting means associated with said leg-folding means whereby said leg-folding means can be adjusted to fold varying lengths of said hosiery.

4. Apparatus in accordance with claim 2 further characterized by having adjusting means associated with said interdigitated transport means whereby the distance through which said hosiery is transported may be adjusted.

5. Apparatus for automatically processing an article formed of relatively sheer material, comprising receiving means adapted to permit alignment of the article to be processed within predetermined limits with respect to said receiving means, tagging means adapted to locate a tag on said article, folding means, insert-placement means adapted to provide an interliner between folds in said article, stamping means, transport means operating between and in cooperation with said receiving, tagging, folding, insert-placement and stamping means, and mechanical driving means adapted to drive, control and time the operations of each of the aforesaid means, whereby said article is processed, transported and delivered.

6. Apparatus for automatically processing an article formed of relatively sheer material, comprising receiving means adapted to permit alignment of the article to be processed within predetermined limits with respect to said receiving means, tagging means adapted to locate a tag on said article, folding means, insert-placement means adapted to provide an interliner between folds in said article, stamping means, transport means operating between and in cooperation with said receiving, tagging, folding, insert-placement and stamping means, sensing means to determine the achievement of the required alignment of said article, operation control means associated with said sensing means and adapted to control the operation of said tagging, insert-placement and stamping means, and mechanical driving means adapted to drive, control and time the operations of each of the aforesaid means, whereby said article is processed, transported and delivered.

7. Apparatus for automatically processing an article formed of relatively sheer material, comprising receiving means adapted to permit alignment of the article to be processed within predetermined limits with respect to said receiving means, tagging means adapted to locate a tag on said article, first folding means adapted to fold said article approximately in half, second folding means adapted to fold over any extending portions of said article against the resulting folded article and third folding means adapted to fold said folded article again, insert-placement means adapted to provide an interliner between folds in said folded article, stamping means, transport means operating between and in cooperation with said receiving, tagging, folding, insert-placement and stamping means, sensing means to determine the achievement of the required alignment of said article, operation control means associated with said sensing means and adapted to control the operation of said tagging, insert-placement and stamping means, and mechanical driving means adapted to drive, control and time the operation of each of the aforesaid means whereby said article is processed, transported and delivered.

8. In an apparatus for processing an article formed of relatively sheer material, folding means adapted to plait said article while maintaining it always in proper alignment, said folding means comprising an interdigitated platform comprising a plurality of bars spaced a predetermined distance apart thereby defining a plurality of spacings therebetween and driving means adapted to rotate said platform through approximately 180°, said platform being further characterized in that the ratio of the surface area of said bars to the area of said spacings is adjusted to cause the pressure acting on the surface of said article in the rotation of said platform in air to maintain said article in place during said rotation and to cause said article to break clean from said platform subsequent to said rotation.

9. In an apparatus for processing an article formed of relatively sheer material, folding means adapted to plait said article while maintaining it always in proper alignment, comprising first and second folders operating in sequence, whereby said first folder first folds said article approximately in half and said second folder then folds over any extending portions of said article onto the resulting plaited article, and driving means adapted to rotate said first folder and said second folder through approximately 180° in said sequence, each of said folders comprising an interdigitated platform of a plurality of bars spaced a predetermined distance apart thereby defining a plurality of spacings therebetween and being further characterized in that the ratio of the surface area of said bars to the area of said spacings is adjusted to cause the pressure acting on the surface of said article in the rotation of said platform in air to maintain said article in place during said rotation and to cause said article to break clean from said platform subsequent to said rotation.

10. In an apparatus for processing an article formed of relatively sheer material, folding means adapted to plait said article while maintaining it always in proper alignment, comprising first and second folders operating in sequence, whereby said first folder first folds said article approximately in half and said second folder then folds over any extending portions of said article onto the resulting plaited article, first driving means associated with said first folder and adapted to rotate it through approximately 180° and second driving means associated with said second folder and adapted to elevate said first folder during the rotation of said first folder and to rotate said second folder through approximately 180° subsequent to said rotation of said first folder, each of said folders comprising an interdigitated platform of a plurality of bars spaced a predetermined distance apart thereby defining a plurality of spacings therebetween and being further characterized in that the ratio of the surface area of said bars to the area of said spacings is adjusted to cause the pressure acting on the surface of said article in the rotation of said platform in air to maintain said article in place during said rotation and to cause said article to break clean from said platform subsequent to said rotation.

11. In an apparatus for processing an article formed of relatively sheer material including operational means for processing said article, a transport means for moving said article between said operational means, folding means adapted to plait said article while maintaining it always in proper alignment and driving means adapted to rotate said folding means through approximately 180°, said folding means comprising a first folder adapted to fold said article approximately in half, a second folder adapted to fold over any extending portions of said article against the resulting folded article and a third folder adapted to fold said article again, each of said folders being an interdigitated platform comprising a plurality of bars spaced a predetermined distance apart thereby defining a plurality of spacings therebetween and driving means adapted to rotate said platform through approximately 180°, each of said platforms being further characterized in that the ratio of the surface area of said bars to the area of said spacings is adjusted to cause the pressure acting on the surface of said article in the rotation of said platform in air to maintain said article in place during said rotation and to cause said article to break clean from said platform subsequent to said rotation.

12. In an apparatus for processing an article formed of relatively sheer material including operational means for processing said article, a transport means for moving said article between said operational means, folding means adapted to plait said article while maintaining it always in proper alignment and driving means adapted to rotate said folding means through approximately 180°, said folding means comprising a first folder adapted to fold said article approximately in half, adjusting means associated with said folder whereby said first folder may be positioned relative to said transport means to fold articles of varying lengths, a second folder adapted to fold over any extending portions of said article against the resulting folded article and a third folder adapted to fold said article again, each of said folders being an interdigitated platform comprising a plurality of bars spaced a predetermined distance apart thereby defining a plurality of spacings therebetween and driving means adapted to rotate said platform through approximately 180°, each of said platforms being further characterized in that the ratio of the surface area of said bars to the area of said spacings is adjusted to cause the pressure acting on the surface of said article in the rotation of said platform in air to maintain said article in place during said rotation and to cause said article to break clean from said platform subsequent to said rotation.

13. In an apparatus for processing an article formed of relatively sheer material including operational means for processing said article and interdigitated transport means comprising intermeshing stationary bars and moving bars, folding means adapted to plait said article while maintaining it always in proper alignment, said folding means comprising a platform and means to rotate said platform through approximately 180°, said platform comprising a plurality of interdigitated bars adapted to intermesh with said stationary bars of said transport means, whereby said article is folded on said stationary bars by the rotation of said platform.

14. In an apparatus for processing nylon hosiery including operational means for processing said hosiery and transport means for moving said hosiery between said operational means, folding means for reducing the length dimension of said hosiery to approximately one-fourth that of said hosiery before folding, said folding means comprising a first leg folder adapted to fold said hosiery to approximately one-half its original length, a second foot folder associated with said first leg folder adapted to fold the extending foot portion of said hosiery over the half-folded hosiery subsequent to the operation of said first leg folder, and a third welt folder adapted to fold said half-folded hosiery to approximately one-half length whereby the length of the resulting folded hosiery is approximately one-fourth its original length, each of said folders being an interdigitated platform comprising a plurality of bars spaced a predetermined distance apart thereby defining a plurality of spacings therebetween and driving means adapted to rotate said platform through approximately 180°, said platform being further characterized in that the ratio of the surface area of said bars to the area of said spacings is adjusted to cause the pressure acting on the surface of said hosiery in the rotation of said platform in air to maintain said article in place during said rotation and to cause said article to break clean from said platform subsequent to said rotation.

15. Apparatus in accordance with claim 14 further characterized by having means associated with said second foot folder for raising said foot folder out of the path of said first leg folder during the operation of said leg folder.

16. Apparatus in accordance with claim 14 further characterized by having adjusting means associated with said first leg folder whereby said first folder may be positioned relative to said transport means to fold hosiery of varying lengths.

17. Apparatus for automatically processing an article formed of relatively sheer material, comprising receiving means adapted to permit alignment of the article to be processed within predetermined limits with respect to said receiving means, tagging means adapted to locate a tag on said article, folding means, insert-placement means adapted to provide an interliner between folds in said article and incorporating vacuum cups, means for controlling vacuum to said cups and means for continuously maintaining a supply of said interliners within a predetermined supply limit, stamping means, transport means operating between and in cooperation with said receiving, tagging, folding, insert-placement and stamping means, sensing means to determine the achievement of the required alignment of said article, operation control means associated with said sensing means and adapted to control the operation of said tagging, insert-placement and stamping means, and mechanical driving means adapted to drive, control and time the operations of said receiving, tagging, folding, insert-placement, stamping, transport, sensing and operation means whereby said article is processed, transported and delivered.

18. In an apparatus for processing an article formed of relatively sheer material including means for folding said article, insert-placement means for positioning inserts on said article prior to a folding operation, said insert-placement means comprising insert supply means, vacuum pick-up cups, framework supporting said cups, means for imparting to said framework a back and forth motion between said insert supply means and the drop area on said article for said insert whereby said cups are always positioned in the same relation with respect to the plane of said insert at said supply means and at said drop area, means for supplying vacuum to said cups when positioned over said supply means and means for releasing said vacuum in said cup when positioned over said drop area.

19. In an apparatus for processing an article formed of relatively sheer material including means for folding said article, insert-placement means for positioning inserts on said article prior to a folding operation, said insert-placement means comprising insert supply means, vacuum pick-up cups, framework supporting said cups, means for imparting to said framework a back and forth motion between said insert supply means and the drop area on said article for said insert whereby said cups are always positioned in the same relation with respect to the plane of said insert at said supply means and at said drop area, means for supplying vacuum to said cups when positioned over said supply means and means for releasing said vacuum in said cup when positioned over said drop area, and sensing means adapted to provide a continuous supply of said inserts incorporating a sensing head, a ratchet wheel, a pawl responsive to a predetermined position of said sensing head whereby said pawl is caused to engage and rotate said ratchet wheel, lifting means associated with said supply of said inserts and means for mechanically connecting said ratchet wheel and said lifting means whereby said lifting means raises said supply of said inserts when said ratchet wheel is caused to rotate.

20. Apparatus for automatically processing an article formed of relatively sheer material, comprising receiving means adapted to permit alignment of the article to be processed within predetermined limits with respect to said receiving means, tagging means adapted to locate a tag on said article, folding means, insert-placement means adapted to provide an interliner between folds in said article, stamping means, interdigitated transport means operating between and in cooperation with said receiving, tagging, folding, insert-placement and stamping means and comprising a plurality of parallel stationary bars and a plurality of parallel transporting bars, said bars being spaced a predetermined distance apart thereby defining a plurality of said spacings therebetween, and means for moving said transporting bars within said spacings whereby said article is picked up by said transporting bars from one position on said stationary bars and delivered to another position on said stationary bars, sensing means to determine the achievement of said alignment, operation control means associated with said sensing means and adapted to control the operation of said tagging, insert-placement and stamping means, and mechanical driving means adapted to drive, control and time the operations of each of the aforesaid means, whereby said article is processed, transported and delivered.

21. In an apparatus for processing an article formed of relatively sheer material including a plurality of operational stations, interdigitated transport means for transporting said article between said stations comprising a plurality of parallel stationary bars and a plurality of parallel transporting bars spaced a predetermined distance apart thereby defining a plurality of spacings therebetween, the width of said bars being less than the width of said spacings and the upper surface of said bars contacting said article being smooth, and means for moving said transporting bars in a cycle consisting of upward, forward, downward and backward motions whereby said article is raised above said stationary bars located at one of said stations, transported by said transporting bars and delivered to said stationary bars located at another of said stations, said transporting bars passing between said stationary bars during said cycle.

22. In an apparatus for processing an article formed of relatively sheer material including a plurality of operational stations, interdigitated transport means for transporting said article between said stations comprising a plurality of parallel stationary bars of uniform width and a plurality of parallel transporting bars of the same width as the width of said stationary bars, the upper surface of said bars contacting said article being smooth and said bars being spaced a predetermined distance apart thereby defining a plurality of spacings therebetween and being of a width less than the width of said spacings whereby said transporting bars are free to move within said spacings, the ratio of the surface area of said bars to the area of said spacings therebetween being so adjusted as to permit said article to remain relatively taut during rest on said stationary bars and during transport and to cause said article to break clean from said bars during pickup and delivery and means for moving said transporting bars in a cycle consisting of upward, forward, downward and backward motions whereby said article is raised above said stationary bars located at one of said stations, transported by said transporting bars and delivered to said stationary bars located at another of said stations, said transporting bars passing between said stationary bars during said cycle.

23. Apparatus in accordance with claim 22 further characterized by having associated with said driving means adjusting means whereby the extent of said motions in said cycle may be varied.

24. Apparatus for automatically processing an article formed of relatively sheer material, comprising receiving means adapted to permit alignment of the article to be processed within predetermined limits with respect to said receiving means, tagging means adapted to locate a tag on said article, folding means, insert-placement means adapted to provide an interliner between folds in said article, stamping means, transport means operating between and in cooperation with said receiving, tagging, folding, insert-placement and stamping means, memory control means, inspection means to determine the position of said article on said receiving means relative to predetermined location limits established on said receiving means, means for transmitting information concerning said position to said memory control means whereby said memory control means electrically controls the operation of said tagging, insert-placement and stamping means, and mechanical driving means adapted to drive, control and time the operations of said receiving, tagging, folding, insert-placement, stamping, transport and inspection means whereby said article is processed, transported and delivered.

25. In an apparatus for processing an article formed of relatively sheer material including receiving means adapted to receive said article aligned within predetermined limits with respect to said receiving means and a plurality of operational stations, inspection means for determining the position of said article within said predetermined limits comprising moveable support means, a forward and after sensing head positioned in said support means, forward and after contact strips located in said receiving means and electrically insulated therefrom, first relay means adapted to receive electrical signals from said forward sensing head and said forward contact strip, second relay means adapted to receive electrical signals from said after sensing head and said after contact strip, and means for moving said support means whereby said forward and after sensing heads are in a position to make contact with said forward and after contacting strips, respectively.

26. Apparatus for automatically processing an article formed of relatively sheer material, comprising receiving means adapted to permit alignment of the article to be processed within predetermined limits with respect to said receiving means, tagging means adapted to locate a tag on said article, folding means, insert-placement means adapted to provide an interliner between folds in said article, stamping means, transport means operating between and in cooperation with said receiving, tagging, folding, insert-placement and stamping means, inspection means to determine the achievement of the required alignment of said article, control means adapted to control the operation of said tagging, insert-placement and stamping means comprising a plurality of memory relays and a plurality of multi-pole control decks associated with said memory relays, said memory relays adapted to receive control information from said inspection means and to relay said information to operating means associated with said tagging, insert-placement and stamping means, and mechanical driving means adapted to drive, control and time the operations of said receiving, tagging, folding, insert-placement, stamping, transport and inspection means whereby said article is processed, transported and delivered.

27. In an apparatus for processing an article formed of relatively sheer material including receiving means adapted to receive said article aligned within predetermined limits with respect to said receiving means, a plurality of operational stations and inspection means for determining the position of said article within said predetermined limits, memory control means comprising means for receiving electrical signals from said inspection means, multi-deck stepping switch means having a plurality of positions, a plurality of memory relays each being associated with one of said positions of said switch means, a plurality of control deck means each being associated with one of said memory relays, and means for transmitting signals from said control deck means to said operational stations.

References Cited in the file of this patent

UNITED STATES PATENTS

| | | |
|---|---|---|
| 1,494,319 | Chalman | May 13, 1924 |
| 2,616,594 | Calder et al. | Nov. 4, 1952 |
| 2,838,217 | Bowman et al. | June 10, 1958 |